US008990423B2

(12) United States Patent
Voigt et al.

(10) Patent No.: US 8,990,423 B2
(45) Date of Patent: *Mar. 24, 2015

(54) SYSTEMS AND METHODS FOR DISCOVERING NETWORK TOPOLOGY

(71) Applicant: Level 3 Communications, LLC, Broomfield, CO (US)

(72) Inventors: Joshua D. Voigt, Westminster, CO (US); Christopher T. Coston, Superior, CO (US); Robert J. Feuerstein, Boulder, CO (US); Daniel Youngblood, Broomfield, CO (US); Dan Rosenstock, Broomfield, CO (US); Troy Kau, Arvanda, CO (US); Greg Bernhardt, Thornton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,924

(22) Filed: Jan. 7, 2013

(65) Prior Publication Data
US 2013/0121686 A1 May 16, 2013

Related U.S. Application Data

(63) Continuation of application No. 11/259,448, filed on Oct. 26, 2005, now Pat. No. 8,352,632.

(51) Int. Cl.
*G06F 15/16* (2006.01)
*H04L 12/24* (2006.01)
(Continued)

(52) U.S. Cl.
CPC ............... *H04L 41/12* (2013.01); *H04L 41/08* (2013.01); *H04L 43/0811* (2013.01); *H04B 10/07* (2013.01); *H04L 41/0681* (2013.01); *H04L 41/085* (2013.01); *H04L 41/0866* (2013.01)
USPC ............ 709/237; 709/218; 709/223; 709/224

(58) Field of Classification Search
USPC .................................. 709/218, 223, 224, 237
See application file for complete search history.

(56) References Cited

U.S. PATENT DOCUMENTS 5,337,352 A 8/1994 Kobayashi et al.
5,353,283 A 10/1994 Tsuchiya
(Continued)

FOREIGN PATENT DOCUMENTS

EP 0568477 A2 11/1993
EP 0926860 A2 6/1999
(Continued)

OTHER PUBLICATIONS

International Searching Authority, U.S. Patent and Trademark Office as Receiving Office, International Search Report (Form PCT/ISA/210) for international application No. PCT/US2006/037700 Jul. 6, 2007, 2.

(Continued)

*Primary Examiner* — Liangche A Wang

(57) ABSTRACT

A method for determining network topology of a provider network includes selecting a first network element, selecting a first port on the first network element, and iteratively performing connectivity validation tests using the first port, wherein each connectivity validation test is associated with a type of network element and yields a result that indicates whether a second port on a second network element of the associated type is connected to the first port. A system for discovering topology of a network, the system comprising a topology discovery engine in operable communication with a near network element and operable to identify a first port of a far network element that is connected to a second port of the near network element by remotely altering operation of the near network element to cause the second network element to respond in a manner that identifies the first port.

22 Claims, 14 Drawing Sheets

(51) Int. Cl.
*H04L 12/26* (2006.01)
*H04B 10/07* (2013.01)

(56) References Cited

U.S. PATENT DOCUMENTS

| | | | |
|---|---|---|---|
| 5,402,478 A | | 3/1995 | Hluchyj et al. |
| 5,586,254 A | | 12/1996 | Kondo et al. |
| 5,619,489 A | * | 4/1997 | Chang et al. ............... 370/241 |
| 5,680,448 A | | 10/1997 | Becker |
| 5,809,282 A | | 9/1998 | Cooper et al. |
| 5,841,759 A | | 11/1998 | Russ et al. |
| 6,005,696 A | | 12/1999 | Joline et al. |
| 6,134,671 A | | 10/2000 | Commerford et al. |
| 6,201,620 B1 | * | 3/2001 | Anhorn ....................... 398/23 |
| 6,301,244 B1 | | 10/2001 | Huang et al. |
| 6,603,742 B1 | | 8/2003 | Steele, Jr. et al. |
| 6,654,802 B1 | | 11/2003 | Oliva et al. |
| 6,662,221 B1 | | 12/2003 | Gonda et al. |
| 6,676,304 B1 | | 1/2004 | Coin et al. |
| 6,857,027 B1 | | 2/2005 | Lindeborg et al. |
| 6,948,101 B2 | | 9/2005 | Saito |
| 7,012,934 B1 | | 3/2006 | Nisbet et al. |
| 7,058,012 B1 | * | 6/2006 | Chen et al. ................... 370/222 |
| 7,085,237 B1 | * | 8/2006 | Teodorescu ................... 370/242 |
| 8,352,632 B2 | | 1/2013 | Voigt et al. |
| 2001/0033550 A1 | | 10/2001 | Banwell et al. |
| 2002/0143872 A1 | | 10/2002 | Weiss et al. |
| 2003/0117125 A1 | * | 6/2003 | Rahmatian et al. ............ 324/96 |
| 2003/0117962 A1 | | 6/2003 | Mattson et al. |
| 2003/0133556 A1 | * | 7/2003 | Naik et al. ............... 379/201.12 |
| 2004/0151494 A1 | * | 8/2004 | King et al. ..................... 398/16 |
| 2005/0047350 A1 | * | 3/2005 | Kantor et al. ............... 370/254 |

FOREIGN PATENT DOCUMENTS

| | | |
|---|---|---|
| EP | 1014627 A1 | 6/2000 |
| EP | 1263260 A1 | 12/2002 |
| EP | 1473872 | 3/2004 |
| WO | WO-99/21336 A1 | 4/1999 |
| WO | WO-01/86435 A2 | 11/2001 |
| WO | WO-02/19135 A1 | 3/2002 |
| WO | WO-02/41578 A2 | 5/2002 |

OTHER PUBLICATIONS

International Searching Authority, U.S. Patent and Trademark Office as Receiving Office, Written Opinion of the International Searching Authority (Form PCT/ISA/237) for international application No. PCT/US2006/037700 Jul. 6, 2007, 8.

Supplementary European Search Report, dated Dec. 1, 2009, EP Application No. 06804198, 5 pgs.

Barberis, G. et al., A Shortest route algorithm for graphs having weighted nodes and arcs with application to S/F communication networks, XP 000669311A, *CSELT Rapporti tecnici*—vol. V—No. 1, Mar. 1997, vol. 5. No. 1., p. 63-66.

Dijkstra, E. W. A Note on Two Problems in Connexion with Graphs, XP-000837527 *Numerische Mathematik 1*, vol. 1. Berlin, DE 1959, p. 269-271.

Doshi, B. T. et al., Overview of INDT—A New Tool for Nex1Generation Network Design, IEEE 1995(0-7803-2509-5/95), 1942-1946.

Ishiwa, N. et al., An Expert System for Planning Private Networks, *NEC Research and Development, Nippon Electric Ltd.* Tokyo, JP,vol. 35, No. 3, XP000468662A Jul. 1, 1994, pp. 306-314.

Lee, W. C. et al., Routing Subject to Quality of Service Constraints in Integrated Communication Networks, *8302 IEEE Network 9*, No. 4, New York, US US XP 526591A Jul./Aug. 1995, p. 46-55.

Martin, J. Computer Networks and Distributed Processing Software, Techniques, and Architecture, Prentice-Hall, Inc., Englewood Cliffs, NJ 1981.

Stallings, W. Data and Computer Communications, *Macmillan Publishing Company* ISBN 0-02-415451-2 Second Edition. 1988.

Tenenbaum, Shortest Path Routing, Chapter 5, *The Network Layer*, XP-002189337 (1996), , p. 348-365.

* cited by examiner

SYSTEMS AND METHODS FOR DISCOVERING NETWORK TOPOLOGY

REFERENCE TO RELATED APPLICATIONS

This application is a Continuation of and claims the benefit of priority to U.S. patent application Ser. No. 11/259,448, filed Oct. 26, 2005, entitled "SYSTEMS AND METHODS FOR DISCOVERING NETWORK TOPOLOGY," which is incorporated by reference herein in its entirety.

BACKGROUND

A communication network typically employs numerous network elements (NEs) for exchanging data across the network for delivery to a final destination. For example, within a Synchronous Optical Network (SONET), long-haul transport, ADMs, digital cross-connect systems, and other NEs communicate data to and from end-user buildings (EUBs) and other networks. SONET standards do not precisely define every aspect of the communications protocol, thereby allowing for different vendor NEs with different operational specifications. Also, a SONET network typically supports large numbers (e.g., thousands to millions) of communication sessions simultaneously. Thus, SONETs typically include numerous types of NEs from many different vendors interconnected with each other in very complex configurations. In addition, changes are frequently made to the NE configurations and interconnections. Consequently, maintaining an accurate record of these complicated configurations and interconnections at any point in time is a significant challenge.

To attempt to keep track of the NE and circuit configurations, some network providers use provisioning databases that store data representing the configuration of NEs and circuits in the network. A significant problem that has been identified relates to inaccurate representation of the actual network configuration in the provisioning database. Generally this problem arises when changes to the network are not updated in the provisioning database. Exemplary changes are a change in the model of an NE, or a change to port connections between NEs.

While most network changes are properly provisioned, some are erroneously provisioned. For example, a Fujitsu ADM may be replaced with a newer model, with connections to the ports of existing NEs being correctly provisioned. However, loopback conditions that are made for testing purposes are often not deprovisioned after the test. As another example, technicians may simply make mistakes, such as connecting the wrong ports between NEs. Regardless of whether such changes are made properly or in error, changes in NE configuration are very common (e.g., occurring throughout a network everyday), and often occur in an uncontrolled and/or undocumented manner.

Due to the complexity of NE configurations, the large number of interconnections, and the frequency of change, the current state of NE configuration can be extremely difficult to identify if the provisioning database is not updated when changes are made; and if errors are made during provisioning, the current state is not easily discernible even if the provisioning database is updated. Once connections are made between NEs, manually identifying them can be a painstaking, and time-consuming task because of the vast number of connections between NEs. Unfortunately, as indicated above, the provisioning database is frequently not updated, and provisioning errors are made. Consequently the provisioning database typically does not accurately reflect the actual network configuration.

If the provisioning database does not accurately reflect the actual NE configuration of the network, this can pose significant problems for the network provider. For example, if equipment fails on the network, the database will not provide accurate information to enable network administrators to quickly identify the source of the problem, and fixing the problem may take much longer than necessary. In addition, customers may be billed incorrectly because of incorrect assumptions about the network configuration. Furthermore, network capacity may be wasted, particularly in situations when loopback conditions are erroneously left on the network. In addition, provisioning errors may not be known until a fault condition occurs.

SUMMARY

For the foregoing and other reasons, embodiments of the present invention have been developed for discovering network topology. Network topology (or simply topology) generally refers to the interconnections among network elements on the network. Some embodiments can automatically identify interconnected network elements (NEs). Some embodiments identify physical loopback conditions at NEs. Some embodiments determine protection schemes employed by NEs. These and other embodiments can be carried out from a central location on the network, obviating tedious manual discovery of network topology. Because embodiments are automated, the discovered topology reflects the actual topology at a high level of accuracy.

An embodiment of a method for determining network topology of a provider network includes selecting a first network element, selecting a first port on the first network element, and iteratively performing connectivity validation tests using the first port, wherein each connectivity validation test is associated with a type of network element and yields a result that indicates whether a second port at a second network element of the associated type is connected to the first port of the first network element.

An embodiment of a system for discovering network topology includes a topology discovery engine operable to remotely determine whether a selected port on a first network element is connected to a port on a second network element. The topology discovery engine can perform one or more connectivity validation tests (CVTs). Each CVT can be of a specified type. Each type of CVT may be applicable to one or more predetermined types or models of network elements.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
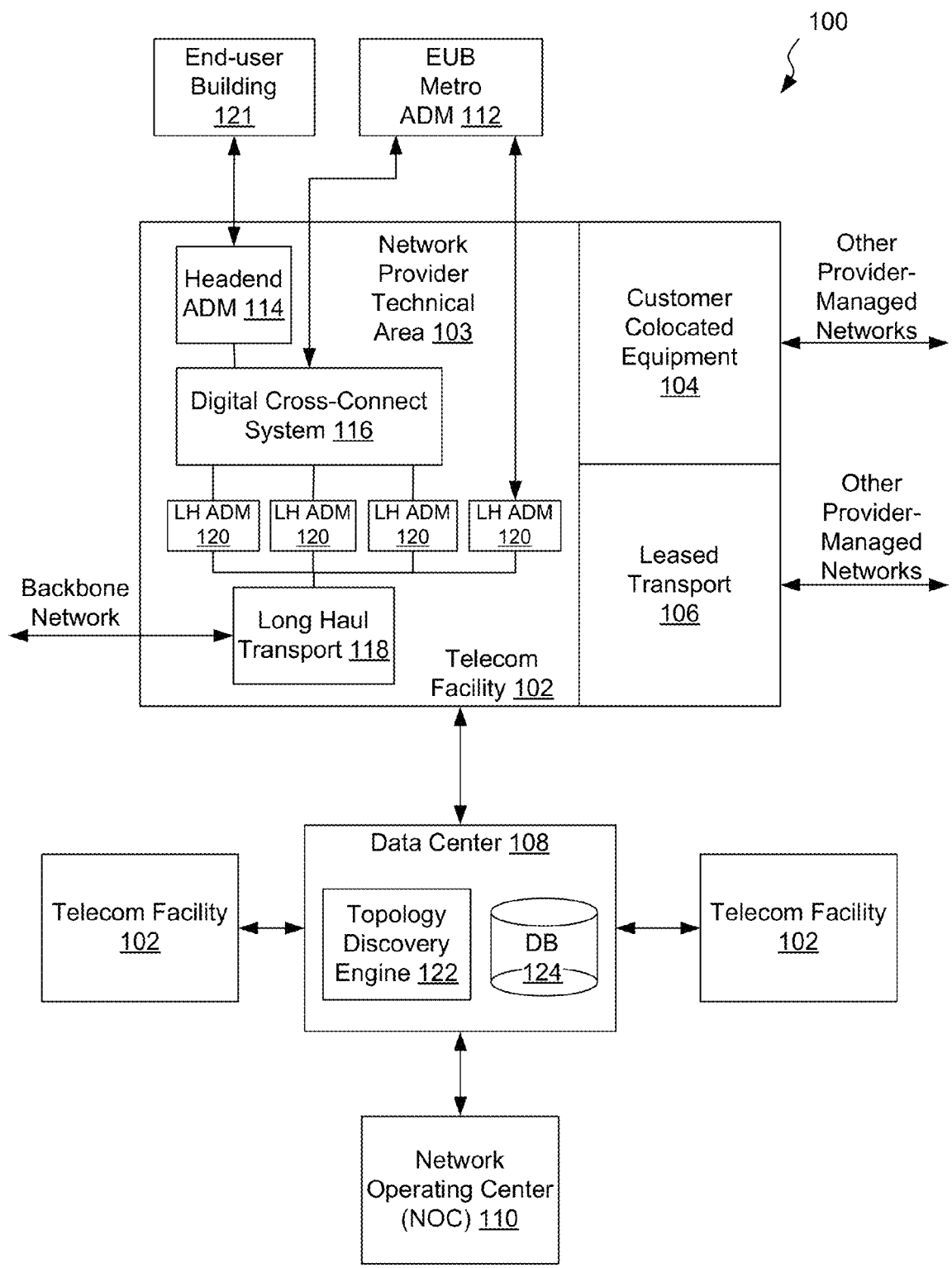
FIG. 1 is a schematic diagram illustrating an exemplary operating environment for carrying out network topology discovery in accordance with one embodiment of the present invention.

Embodiments of the present invention relate generally to communication networks, and more particularly to systems and methods for discovering network topology. Network topology (or simply topology) generally refers to the interconnections among network elements on the network. In general, topology discovery relates to processes for identifying network elements and interconnections among network elements (NEs) that have been provisioned on a network.

While embodiments described herein are directed primarily at topologies in a Synchronous Optical Networks (SONET) or Synchronous Digital Hierarchy (SDH) environment, it is to be understood that the processes and systems described herein can be readily adapted to other types of networks. By way of example, but not limitation, the methods described herein could be readily adapted by one skilled in the art to discover network topology in a Gigabit Ethernet (Gig-E, 10 Gig-E, etc.) environment, as well as links using digital wrappers to enclose SONET or Ethernet signals.

Some embodiments test port connectivity without affecting network traffic. Examples network-affecting tests include using SONET OH bytes, Ethernet Frame bytes, GFP or digital wrapper bytes to generate an alarm, event or state change at a remote port to determine if a selected port is connected.

In other embodiments of topology discovery tests, network traffic may be affected. Examples of tests that may affect network traffic include LOS/AIS. In yet other embodiments, configuration information is used to discovery network topology. An example of an embodiment that uses configuration information is STS mapping.

Embodiments described herein carry out topology discovery in an automated fashion. This can include remotely identifying NEs, and/or their interconnection, via a computing device in communication with one or more NEs. Identification of an NE can involve identifying the vendor, location, model, or other characteristics of the NE.

Some embodiments of processes for topology discovery employ methods of connectivity validation to identify an NE that is connected to a port of another NE. NE's can be identified by identification data, such as, but not limited to location, model, manufacturer, or Internet protocol (IP) address, or telephone information directory (TID) of NE.

Methods of connectivity validation generally use one NE to send predetermined information to, or change configuration options on a port of, an unidentified NE in a specified manner. If the method of connectivity validation corresponds to the unidentified NE, the information sent to the unidentified NE sets a condition in the NE, or causes the NE to respond in a predetermined manner. Based on the condition or the response, the unidentified NE and/or the connected port of the unidentified NE can be identified.

Embodiments of connectivity validation tests can take advantage of functionality that is specific to various types of NEs. For example, while a synchronization status messaging (SSM) method (described in detail below) may be used to identify a NORTEL LH, SSM may not be applicable to a FLASH-192; but, a 1-Byte section trace method may be used to identify the FLASH-192. Thus, depending on the types of NEs that may be expected on the network, associated methods of connectivity validation can be used to discover port connectivity between NEs. In some embodiments, connectivity validation involves detecting an alarm report or event report, or searching for an autonomous message in response to a predetermined event.

Some embodiments validate protection schemes provisioned on NEs. By determining the protection scheme being used, protection scheme incompatibilities can be identified between NEs. For example, a protected port on an NE may be connected to an unprotected port on another NE. In addition, by identifying the protection schemes prior to performing connectivity validation tests, the tests can be performed in a less intrusive or non-intrusive manner.

In this regard, for illustrative purposes, a number of exemplary methods of connectivity validation are described herein; however, the invention is not limited to these particular methods of connectivity validation. Thus, other embodiments could be readily realized that include more, fewer, and/or other methods of connectivity validation than those described herein.

FIG. 1 is a schematic diagram illustrating an exemplary operating environment for carrying out network topology discovery in accordance with one embodiment of the present invention. The exemplary operating environment represents a portion of a Synchronous Optical Network (SONET) 100 operated by a network provider. The SONET 100 interconnects a number of exemplary network elements (NEs) with optical fibers, over which the NEs communicate data with each other.

Although not shown, a backbone network and other provider-managed networks typically connect with the portion of the SONET 100, whereby the SONET 100 facilitates communication between the various networks. FIG. 1 is a simplified representation of a SONET network for illustrative purposes. An actual SONET network typically includes many more NEs interconnected in a relatively complex topology to form numerous circuits supporting numerous communication sessions.

Typically, one or more telecom facilities 102 facilitate inter-network communications. The telecom facilities 102 are typically connected to the backbone network (not shown) and other provider-managed networks (not shown). As such, a telecom facility 102 includes a network provider area 103, a customer collocated equipment (COLO) area 104 and a leased transport (LT) area 106. The COLO area 104 and the leased transport area 106 are locations at which other providers and customers can situate and/or use equipment for connection to the telecom facility 102. Telecom facilities 102 generally switch data between the networks (leased transport networks, the customer networks, and the providers own network), and/or provide connectivity to remote locations in either the metropolitan area, or to distant cities.

A data center 108 can monitor the state of the SONET 100 by gathering data about telecom facilities 102 and NEs configured on the SONET 100. In some embodiments, the data center 108 employs a computing device from which a user or application program can issue commands to NEs around the SONET 100, and receive responses from the NEs. The network operations center (NOC) 110 oversees the network operations. For example, the NOC 110 can use data gathered by the data center 108 to identify problems and performance-related issues related to the SONET 100.

As discussed above, the SONET 100 includes network elements (NEs). Generally, an NE is any entity in the SONET 100 that includes telecommunication equipment for performing network element functions (NEFs). Exemplary NEFs include signaling, switching and/or data transmission/receiving functions, dropping signals, adding signals, multiplexing, and/or demultiplexing. Thus, by way of example, but not limitation, routers, switches, OCS, add-drop multiplexers (ADMs), and wavelength division multiplexers (WDMs), are types of NEs. For illustrative purposes, the embodiment of the SONET 100 in FIG. 1 includes the following exemplary NEs: metro ADMs 112, head-end ADMs 114, digital cross-connect systems (DXCs) 116, long-haul transports 118, and long haul ADMs 120. Head-end ADMs 114 and metro ADMs 112 are connected to end-user buildings (EUBs) 121.

With more specific regard to NEs, an NE typically includes one or more facilities with which the NE interfaces with other NEs and/or path terminating elements. A facility of a network element includes components, such as physical ports, for communication to and from connected NEs. A facility on an NE is not to be confused with a telecommunication facility 102. As described further hereinbelow, a facility of an NE can be protected or working.

An NE has one or more ports. A port is a physical connection point on an NE to which other equipment can connect. Each port on an NE is uniquely identifiable. Depending on the type and design of an NE, the NE can have many ports (e.g., hundreds) to support connections to numerous other NEs and/or path terminating elements, thereby enabling a variety of configurations and optical circuits. Thus, by way of example, the particular embodiment of FIG. 1 illustrates long haul ADMs 120 connected to long haul transport 118 and DXC 116. As another example, DXC 116 is connected to head-end ADM 114 as well as metro ADM 112.

The SONET standard, and other network standards, allow for multi-vendor configurations. As used herein, the term vendor refers to the manufacturer and/or seller of a piece of equipment, such as an NE. Over time, many different vendors have designed, manufactured and deployed numerous different types of NEs on networks around the world, and will continue to do so. NEs can vary in terms of specifications, operation, methods of interconnection, and functions provided, while still abiding by the SONET standard. For example, the Nortel DX ADMs typically support 16-byte section trace, while Fujitsu ADMs (e.g., Flash 2400) typically do not.

The network provider is typically a distributed organization. As such, telecom facilities 102 are generally located at multiple geographic locations, as are the various NEs on the SONET 100. The data centers 108 and NOCs 110 may also be geographically distributed. Generally, but not necessarily, the network provider has several NOCs 110 located at selected large metropolitan areas (e.g., Atlanta, San Jose, New York). Initial implementation of the SONET 100 typically involves choosing the NEs that are to be used and deploying the NEs within the SONET 100 according to network designs to meet communication needs.

After deployment of the NEs, for a variety of reasons, changes are often made to the topology of the SONET 100. Topology changes involve changes to the interconnections and/or configurations of NEs within the SONET 100. For example, at telecom facility 102, one type of ADM (e.g., Nortel OC192 DX ADM) may be replaced by another type (e.g., Fujitsu Flash192 ADM). As another example, a test may require a connection to an NE to be looped back upon the NE (e.g., a transmit port connected to a receive port on the same NE), thereby forming a loopback condition (or simply a "loopback"). Sometimes loopbacks are not properly disconnected or reconnected after the test. As yet another example, in connecting one port to another port, a technician may mistakenly connect the wrong ports and/or the wrong NEs. As yet another example, the customer may incur changes through new orders, cancellations, or upgrades.

As such, over time the topology of the SONET 100 can change with numerous different vendor NEs interconnected in numerous different configurations, both correct and incorrect. Changes that are made may not be documented, and the state of the topology of the SONET 100 can become unknown or only partially known if there is not a way to determine the topology. Beneficially, embodiments of the invention perform functions for discovering network topology and/or changes to network topology. Based on the discovered network topology, remedial action can be taken to improve the network operations.

In one embodiment, the data center 108 employs a topology discovery engine (TDE) 122 and a topology database 124 to identify the topology of the SONET 100. For example, an embodiment of the topology discovery engine 122 can automatically identify connections between NEs, as well as the types (e.g., vendors, models, etc.) of NEs in the SONET 100. Other examples of functions carried out by embodiments of the topology discovery engine 122 include determining protection schemes employed by NEs, as well as identifying loopbacks. Exemplary functions of the topology discovery engine 122 are described in further detail below. The topology discovery engine 122 may be implemented in one or more general-purpose or special-purpose computing devices.

Figure 2:
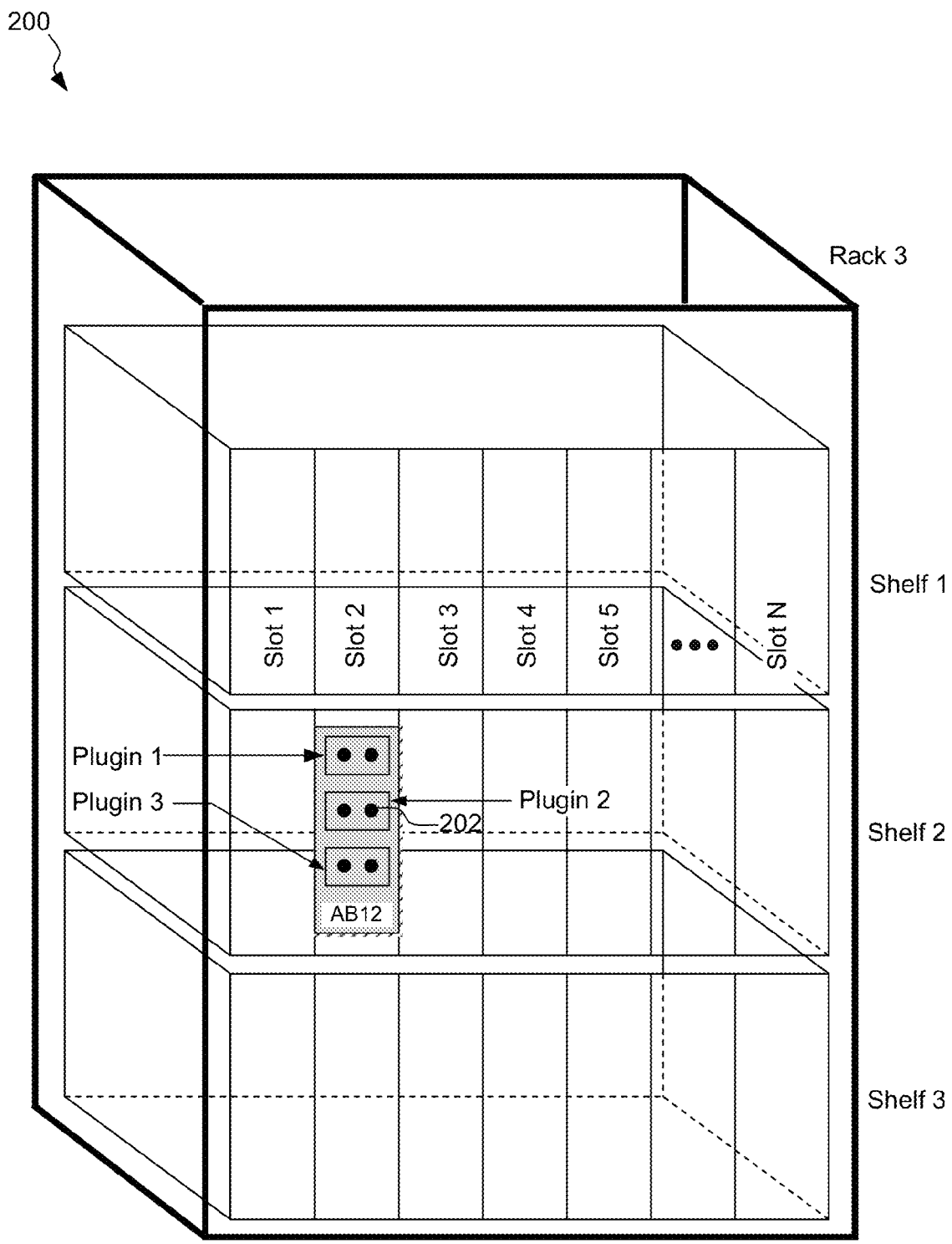
FIG. 2 is a schematic diagram illustrating a perspective view of an exemplary rack of a network element, including shelves, slots, cards, and ports, in accordance with one embodiment of the present invention.

FIG. 2 is a schematic diagram illustrating a perspective view of a rack 200 of an exemplary network element. Rack 200 is designated "Rack 3". The rack 200 includes shelf 1, shelf 2, and shelf 3, each of which include slots for mounting telecommunications cards. By way of example, slots 1 through N are illustrated. Shelf 2 includes card AB 12, which has three plugins: plugin 1, plugin 2, and plugin 3. Each plug-in includes 2 ports. Thus, each port can be designated by the rack, shelf, slot, card, plugin, and port number. For example, port 202 can be designated as rack 3, shelf 2, slot 2, card AB 12, plug-in 2, port 2.

Figure 3:
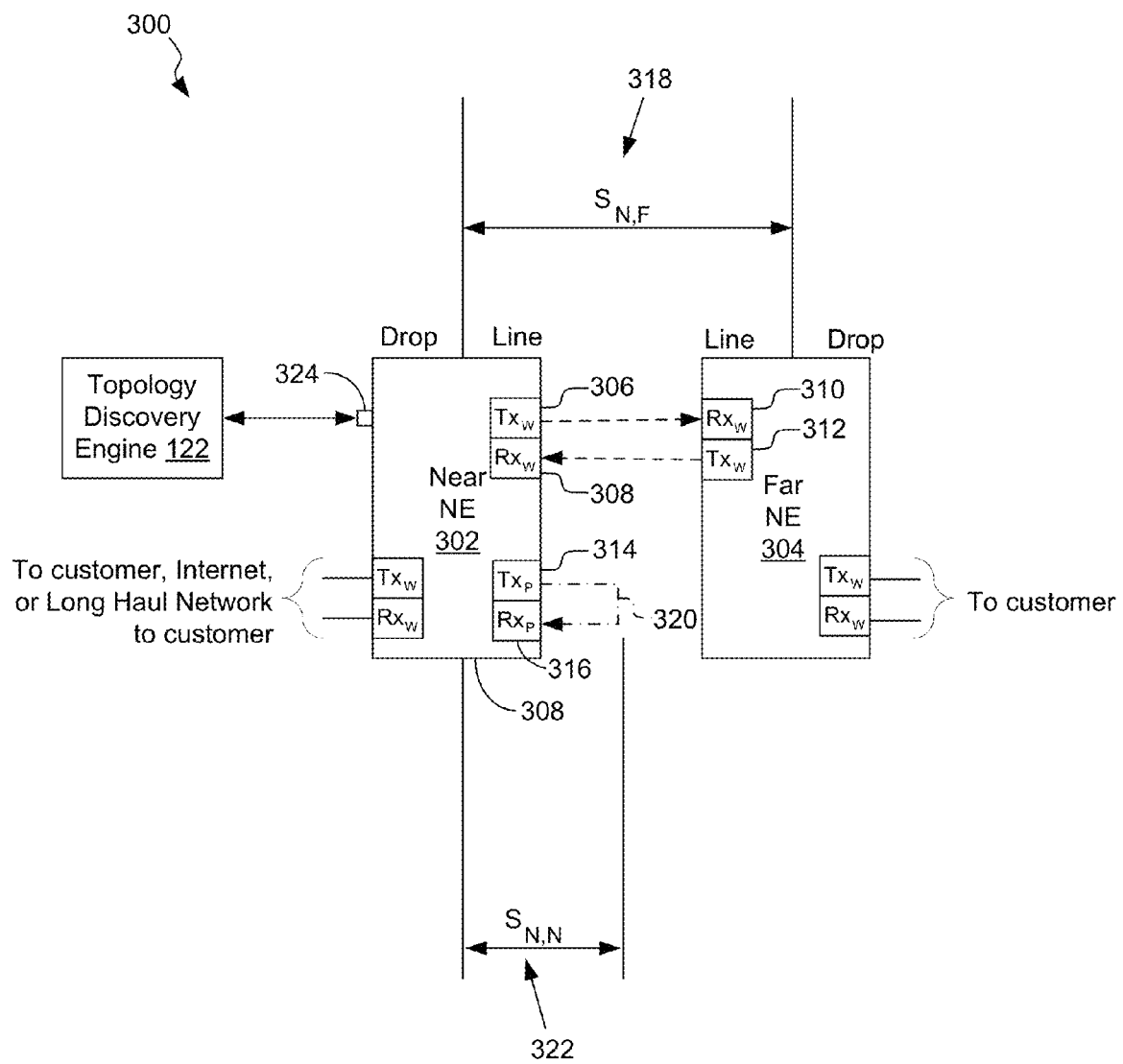
FIG. 3 is a functional block diagram illustrating an exemplary arrangement in which a topology discovery engine can identify an unknown network element, a connection between network elements, and/or a loopback condition.

FIG. 3 is a functional block diagram illustrating an exemplary arrangement 300 in which a topology discovery engine (TDE) 122 can discover topology of a SONET. The simplified arrangement 300 is intended for illustrative purposes. In an actual operating environment, the topology discovery engine 122 would be connected to numerous NEs, which themselves would be connected to numerous other NEs in various configurations.

The simplified arrangement 300 includes a near NE 302 and a far NE 304. As used herein, the terms "far" and "near" are used in a logical, rather than physical, sense. Thus, the far NE 304 is not necessarily physically farther from the TDE 122 than the near NE 302. The near NE 302 is known; i.e., the TDE 122 has, or can readily obtain, information about the identity, configuration, and/or specification of the near NE 302, as well as facilities and ports on the NE 302. Characteristics of the far NE 304, such as type and model, may not be known to the TDE 122 prior to topology discovery. More specifically, prior to topology discovery, the port connections between NE 302 and NE 304 may not be known.

For example, prior to topology discovery, it may not be known a working transmit port 306 on NE 302 is connected to a port on NE 304. The topology discovery engine 122 carries out the process of topology discovery to determine whether working transmit port 306 is connected to a port on NE 304. Topology discovery engine 122 can also identify which port on NE 304 is connected to working transmit port 306, if a connection is discovered. Similarly, topology discovery engine 122 can determine whether working receive port 308 on NE 302 is connected to a port on NE 304, and identify any such connected port on NE 304.

Accordingly, in the exemplary arrangement 300, topology discovery engine 122 can determine that working receive port 310 on NE 304 is connected to working transmit port 306, and can identify working receive port 308 by port, card, slot and/or shelf. Likewise, topology discovery engine 122 can identify the port, card, slot, and/or shelf of working transmit port 312 on NE 304, and determine that working transmit port 312 is connected to working receive port 308.

The transmit port 306, receive port 308, receive port 310, and transmit port 312 are working facilities. Also shown are protected facilities: transmit port 314 and receive port 316 on NE 302. While working facilities 306 and protected facilities 308 can both be used to perform communications between the NEs 302, 304, the protected facilities 314, 316 are typically used as backup facilities in case the working facilities 106 fail. In addition, although the arrangement 300 illustrates protected facilities 314, 316, in some embodiments NEs 302, 304 may not use or include protected facilities, and are designated as unprotected.

For purposes of discussion, some basic SONET terminology is presented. In a SONET environment, facilities are typically classified according to a supported bandwidth. For example, a facility may be classified as OC-192, OC-48, or OC-12. The acronym "OC" stands for "optical carrier", and the number after OC refers to a multiple of the SONET base data rate of 51.84 Mbits/second.

In SONET, the terms section, line, and path are often used to refer to functional portions of a SONET network. In SONET, a section is a portion of a network that includes any two adjacent NEs. Thus, for example, the portion of the network spanning near NE 302 to the far NE 304 forms SONET section $S_{N,F}$ 318. A line includes the transmission medium and associated line terminating equipment for transporting information between two consecutive line terminating NEs. A path is designated at a given bit rate (e.g., OC-48) and refers to the logical connection between the point at which a standard frame format for the signal is assembled, and the point at which the standard frame format for the signal is disassembled. Although the terms section, line, and path do not mean the same thing in SDH as they do in SONET, the skilled reader will be able to easily identify corresponding terms in the SDH standard.

To communicate with the NE 302, the TDE 122 is in communication with a management interface 324 associated with the NE 302. The management interface 324 typically is not a SONET communications port of NE 302, such as receive port 308. Rather, the management interface 324 is typically an external interface, such as Ethernet, which enables communications between the TDE 122 and the NE 302. Database 124 may also be in communication with the NE 302 via the management interface 324. Through the management interface 324, the TDE 122 can query SONET ports on the NE 302 and receive responsive information back from SONET ports on the NE 302.

According to one embodiment, the TDE 122 selects a SONET port (e.g., $Tx_W$ 306) on the near NE 302 and executes a connectivity validation test associated with a predetermined NE of a known type (e.g., a known model, or from a known vendor or manufacturer). The connectivity validation test (CVT) uses the selected port on the near NE 302 to transmit specified commands and/or data in a specified manner. In general, the TDE 122 monitors data received at NE 302 (e.g., at $Rx_W$ 308) for a response, and determines whether the response corresponds to a predetermined response that is indicative of the type of NE associated with the CVT. For example, in some embodiments, a CVT can create an abnormal condition in the far NE 304, causing the far NE 304 to respond in a predetermined manner, such as with an alarm.

If the far NE 304 responds in the predetermined manner, the TDE 122 determines that the far NE 304 is the predetermined type of NE associated with the CVT. If the far NE 302 does not respond in the predetermined manner, the TDE 122 determines that the far NE 304 is not the type of NE associated with the connectivity validation test. In the latter case, the TDE 122 can execute another connectivity validation test associated with a different predetermined type of NE. Various exemplary connectivity validation tests, and data for use therein, are discussed in further detail below. In some embodiments, the TDE 122 can also identify possible far side network elements 304 that support the egress bandwidth and the protection scheme of the near NE 302.

Another function of the TDE 122 involves identifying a loopback 320 (dashed-dotted line) associated with ports of the near NE 302. Generally, a loopback 320 is a physical connection from a port on an NE to another port on the same NE. A section, designated as $S_{N,N}$ 322, contains near NE 302 and loopback 320. Although the exemplary arrangement 300 of FIG. 3 illustrates a loopback 320 connecting a Tx port 314 with a Rx port 316 on the same protect facility, it is to be understood that this is not the only configuration in which loopbacks may be formed. By way of example, but not limitation, a loopback may form a connection between ports on different facilities of an NE. For example, a loopback may connect a working facility with a protect facility (or vice versa). In this example, the protect facility may or may not be the protect facility corresponding to the working facility.

As discussed above, the loopback 320 may arise in a number of different situations. For example, an optical line facility may be looped back for purposes of turn-up testing, trouble shooting testing, or to force support of "hair pinning" in an NE that does not provide the "hair pinning" functionality. The TDE 122 can identify the existence of physical loopbacks 320 for purposes of determining whether the loopbacks 320 are necessary for a legitimate purpose or whether they should be removed, as well as update the database with the correct information.

Throughout this specification, different exemplary types of NEs are referenced for illustrative purposes. For ease of discussion, these exemplary NEs are referred to with mnemonics. Exemplary NEs with their corresponding mnemonics are shown in Table 1.

TABLE 1

Exemplary Network Element Types and Mnemonics

| Network Element Mnemonic | Description |
| --- | --- |
| NTDX | Nortel OC192 DX ADM |
| NTLH | Nortel Optera LH DWDM |

TABLE 1-continued

Exemplary Network Element Types and Mnemonics

| Network Element Mnemonic | Description |
|---|---|
| CD | Ciena CoreDirector UBB |
| 1680 | Alcatel 1680 OGX |
| 1631 | Alcatel 1631 SX LMC |
| FLASH192 | Fujitsu Flash192 ADM |
| FLM2400 | Fujitsu FLM2400 ADM |
| FLM600 | Fujitsu FLM600 ADM |
| MDK2 | Ciena MetroDirector (K2) |
| 1633 | Alcatel 1633 SX Broadband DCS |
| 1630 | Alcatel 1630 SX Narrowband DCS |
| FLM150 | Fujitsu FLM150 ADM |
| 1603/12 | Alcatel 1603/12 DCS |
| 1648 SM | Alcatel 1648 ADM |

Figure 4:
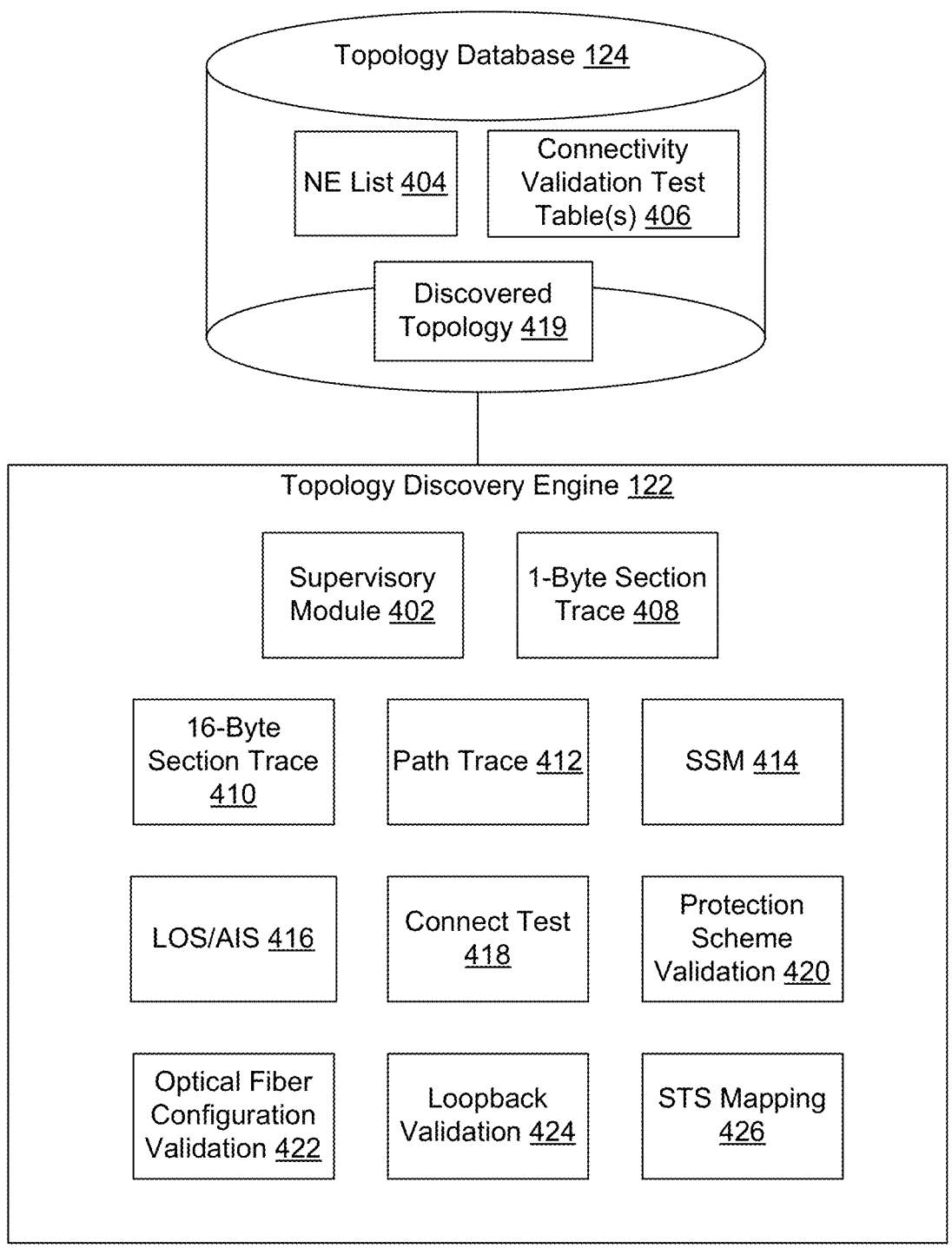
FIG. 4 is a functional block diagram illustrating one embodiment of a topology discovery engine.

FIG. 4 is a functional block diagram illustrating one embodiment of a topology discovery engine 122 and a topology database 124. In this embodiment, the TDE 122 includes functional modules for carrying out topology discovery. These exemplary functional modules can be implemented in software, firmware, hardware, or any combination thereof. The TDE 122 functions can be grouped generally into connectivity validation, section validation, and optical line facility (OLF) mapping comparison. Section validation includes physical loopback validation, protection scheme validation, and optical fiber configuration validation. Each of these processes are discussed in detail below.

Connectivity Validation

Connectivity validation generally refers to identification of connections between NEs. More specifically, the connections are determined between adjacent NE ports, which can be identified by their associated plugin, card, slot, and/or shelf. In one embodiment, connectivity validation involves sequencing through known NEs and identifying unknown NEs connected to each port of the known NEs. In the particular embodiment illustrated in FIG. 4, a supervisory module 402 manages a process of sequencing through each known NE and each port of each NE and identifying NEs connected thereto. An NE list 404 lists known NEs on the network with which the TDE 122 can communicate. In one embodiment, the NE list 404 provides the vendor and type of each NE on the network, as well as a network location identifier enabling the TDE 122 to communicate with the NE to perform network topology discovery. Exemplary identifiers in the NE list 404 could be IP addresses, TID numbers, or others.

In accordance with this embodiment, the supervisory module 402 reads the NE list 404 and selects an NE from the NE list 404. The selected NE is the near (or known) NE (e.g., near NE 302, FIG. 3) from which the supervisory module 402 will perform topology discovery. The supervisory module 404 accesses a connectivity validation test (CVT) table 406 to determine which CVTs can be executed from the selected NE. Generally, the CVT table 406 lists far (or unknown) NEs that might be connected to the near NE, and corresponding CVT(s) to conduct from the near NE to determine if the far NE is the type of NE that corresponds to the CVT. Table 2 and Table 3, shown below, illustrate CVT tables for use in conducting connectivity validation from Nortel 192 DX and Nortel LH Transport, respectively.

TABLE 2

Exemplary Connectivity Validation Tests for a Nortel 192 DX

| Far Network Element | CVT |
|---|---|
| NTDX | 16BST |
| NTLH | 16BST |
| 1680 | 16BST |
| CD | 16BST |
| MDK2 | SSM |
| FLASH-192 | 1BST |
| FLM-2400 | SSM/Connect Test |
| FLM-600 | SSM/Connect Test |

TABLE 3

Exemplary Connectivity Validation Tests for a Nortel LH Transport

| Far Network Element | CVT |
|---|---|
| NTDX | 16BST |
| NTLH | 16BST |
| 1680 | 16BST |
| CD | 16BST |
| MDK2 | SSM |
| FLASH-192 | 1BST |
| FLM-2400 | SSM |

The first column of Table 2 lists far NEs that might be connected to a selected Nortel 192 DX. The second column lists the corresponding CVT for determining whether the far NE is the type of NE listed in column one. Thus, for example, to test whether the far NE is a NTDX, a 16-byte section trace (16BST) could be performed. As another example, to test whether the far NE is an MDK2, a synchronization status messaging (SSM) test could be used. Other CVTs listed include 1-Byte section trace (1BST) and connect test. Similarly, Table 3 lists CVTs that can be conducted from a Nortel LH Transport to determine if the corresponding far NE is connected to the Nortel LH Transport. The exemplary CVTs listed in Tables 2 and 3, and other CVTs, are discussed in detail below with reference to flow charts in FIGS. 6-13.

Because NEs from numerous different vendors may be configured on a SONET, the CVT tables 406 may include one or more other tables corresponding to other NEs that can be expected on the SONET. Table 4 through Table 12 provide CVTs to determine far NEs when the near NE is an Alcatel 1680 OGX Broadband DCS, a Ciena CoreDirector Ultra BroadBand DCS, a Fujitsu FLASH192 ADM, a Fujitsu FLM-2400 ADM, a Fujitsu FLM-600 ADM, a Fujitsu FLM-150 ADM, an Alcatel 1631 SX, Alcatel 1633 SX, or a Ciena MetroDirector K2, respectively. The following tables are provided for illustrative purposes and are not intended to limit the types of NEs or CVTs that may be tested or used by the TDE 122.

TABLE 4

Exemplary CVTs for Alcatel 1680 OGX Broadband DCS

| Far Network Element | CVT |
|---|---|
| NTDX | 16BST |
| CD | 16BST |
| FLASH-192 | 1BST |
| FLM-2400 | Connect Test |
| FLM-600 | Connect Test |
| 1631 SX LMC | Path Trace |

TABLE 5

Exemplary CVTs for Ciena CoreDirector Ultra BroadBand DCS

| Far Network Element | CVT |
|---|---|
| NTDX | 16BST |
| NTLH | 16BST |
| 1680 OGX | 16BST |
| MDK2 | SSM |
| FLASH-192 | Connect Test/Protect LOS |
| FLM-2400 | Connect Test/Protect LOS |
| FLM-600 | Connect Test/Protect LOS |

TABLE 6

Exemplary CVTs for Fujitsu FLASH192 ADM

| Far Network Element | CVT |
|---|---|
| FLASH-192 | 1BST |
| NTDX | 1BST |
| NTLH | 1BST |
| CD | Connect Test/Protect LOS |
| 1680 OGX | 1BST |
| FLM-2400 | SSM/Connect Test |
| FLM-600 | SSM/Connect Test |

TABLE 7

Exemplary CVTs for Fujitsu FLM-2400 ADM

| Far Network Element | CVT |
|---|---|
| FLASH-192 | SSM/Connect Test |
| NTDX | SSM/Connect Test |
| NTLH | SSM |
| CD | Connect Test/Protect LOS |
| 1680 OGX | Connect Test |
| FLM-2400 | SSM/Connect Test |
| FLM-600 | SSM/Connect Test |
| FLM-150 | SSM/Connect Test |
| 1633 SX | Connect Test |
| 1631 | Connect Test |

TABLE 8

Exemplary CVTs for Fujitsu FLM-600 ADM

| Far Network Element | CVT |
|---|---|
| FLASH-192 | SSM/Connect Test |
| NTDX | SSM/Connect Test |
| CD | Connect Test/Protect LOS |
| 1680 OGX | Connect Test |
| FLM-2400 | SSM/Connect Test |
| FLM-600 | SSM/Connect Test |
| FLM-150 | SSM/Connect Test |
| 1633 SX | Connect Test |

TABLE 9

Exemplary CVTs for Fujitsu FLM-150 ADM

| Far Network Element | CVT |
|---|---|
| FLASH-192 | SSM/Connect Test |
| CD | Connect Test/Protect LOS |
| 1680 OGX | Connect Test |

TABLE 9-continued

Exemplary CVTs for Fujitsu FLM-150 ADM

| Far Network Element | CVT |
|---|---|
| FLM-2400 | SSM/Connect Test |
| FLM-600 | SSM/Connect Test |

TABLE 10

Exemplary CVTs for Alcatel 1631 SX

| Far Network Element | CVT |
|---|---|
| FLM-2400 | Connect Test |
| FLM-600 | Connect Test |

TABLE 11

Exemplary CVTs for Alcatel 1633 SX

| Far Network Element | CVT |
|---|---|
| FLM-2400 | Connect Test |
| FLM-600 | Connect Test |
| 1633 | Path Trace |

TABLE 12

Exemplary CVTs for Ciena MetroDirector K2

| Far Network Element | CVT |
|---|---|
| NTDX | SSM |
| NTLH | SSM |
| CD | SSM |
| 1680 OGX | 16BST |
| MDK2 | SSM |

Each of the CVTs listed in the connectivity validation tables 406 can be characterized in terms of the degree to which the CVT intrudes upon, or disrupts, traffic on the circuit being tested. An intrusive CVT is one that may interfere in some way with current communications in the network. For example, the 16-Byte section trace, the 1-Byte section trace, connect test, and SSM are non-intrusive because they do not disrupt traffic on the tested circuit. However, the path test, AIS, and LOS CVTs are intrusive connectivity validation tests because they may interfere with traffic currently on the circuit.

In one embodiment, for each of the CVTs listed in the CVT tables 406, there is a corresponding module to carry out that CVT. Thus, the TDE 122 includes a 1-Byte section trace (1BST) module 408, a 16-Byte section trace (16BST) module 410, a path trace (PT) module 412, a synchronization status messaging (SSM) module 414, an LOS/AIS test module 416, a connect test module 418. In one embodiment, at each near NE, the supervisory module 402 executes each of the modules associated with the near NE to obtain connectivity results. The connectivity results are stored in discovered topology 419.

Turning to the 1BST module 408 and the 16BST module 410, these modules identify a far NE based on results from a 1-Byte section trace test and a 16-Byte section trace test, respectively. In general, the 1BST module 408 and the 16BST module 410 transmit section trace bytes and set expected section trace at the near NE, and identify an alarm or other condition received from the far side NE. Thus, the algorithm for carrying out the traces will depend on the particular near NE being used.

Figure 7:
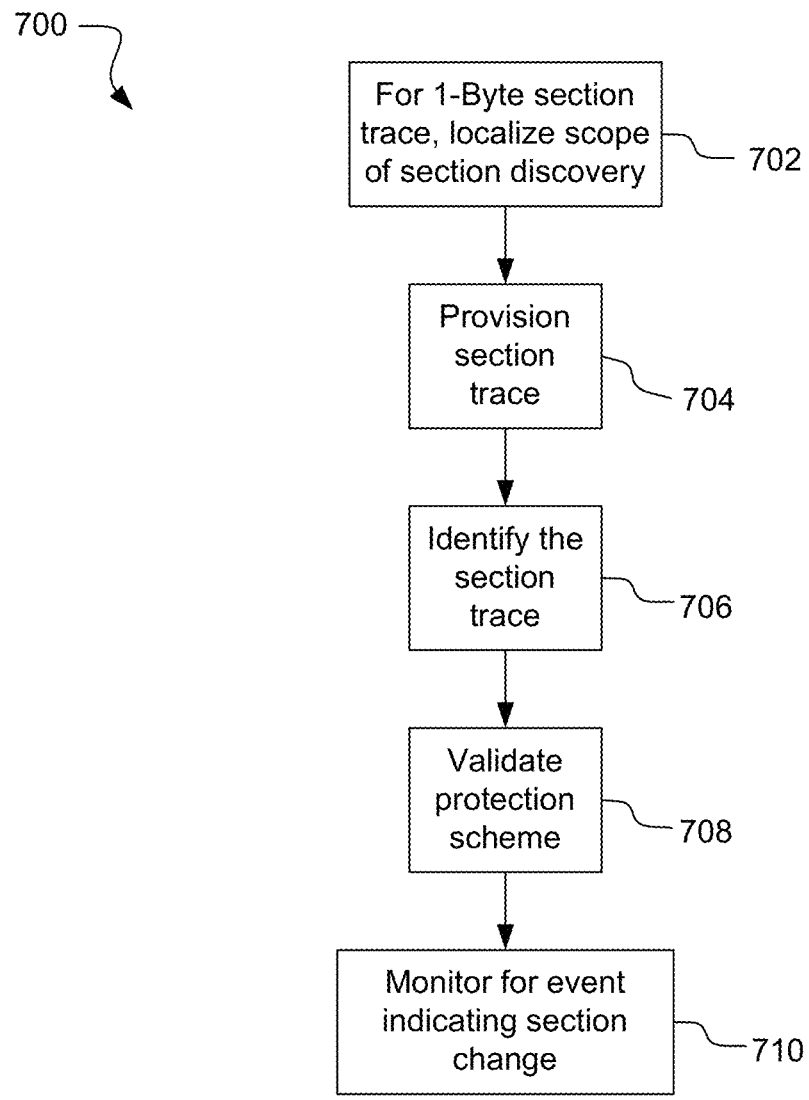

In the case of the 1BST module 408, FLASH-192 network elements support the 1 Byte Section Trace. The 16BST is supported by the following NEs: NTLH, NTDX, 1680 OGX, CoreDirector. Embodiments of algorithms that can be carried out by the 1BST module 408 and 16BST module 410, respectively, are shown in FIG. 7 and discussed in detail below.

Figure 8:
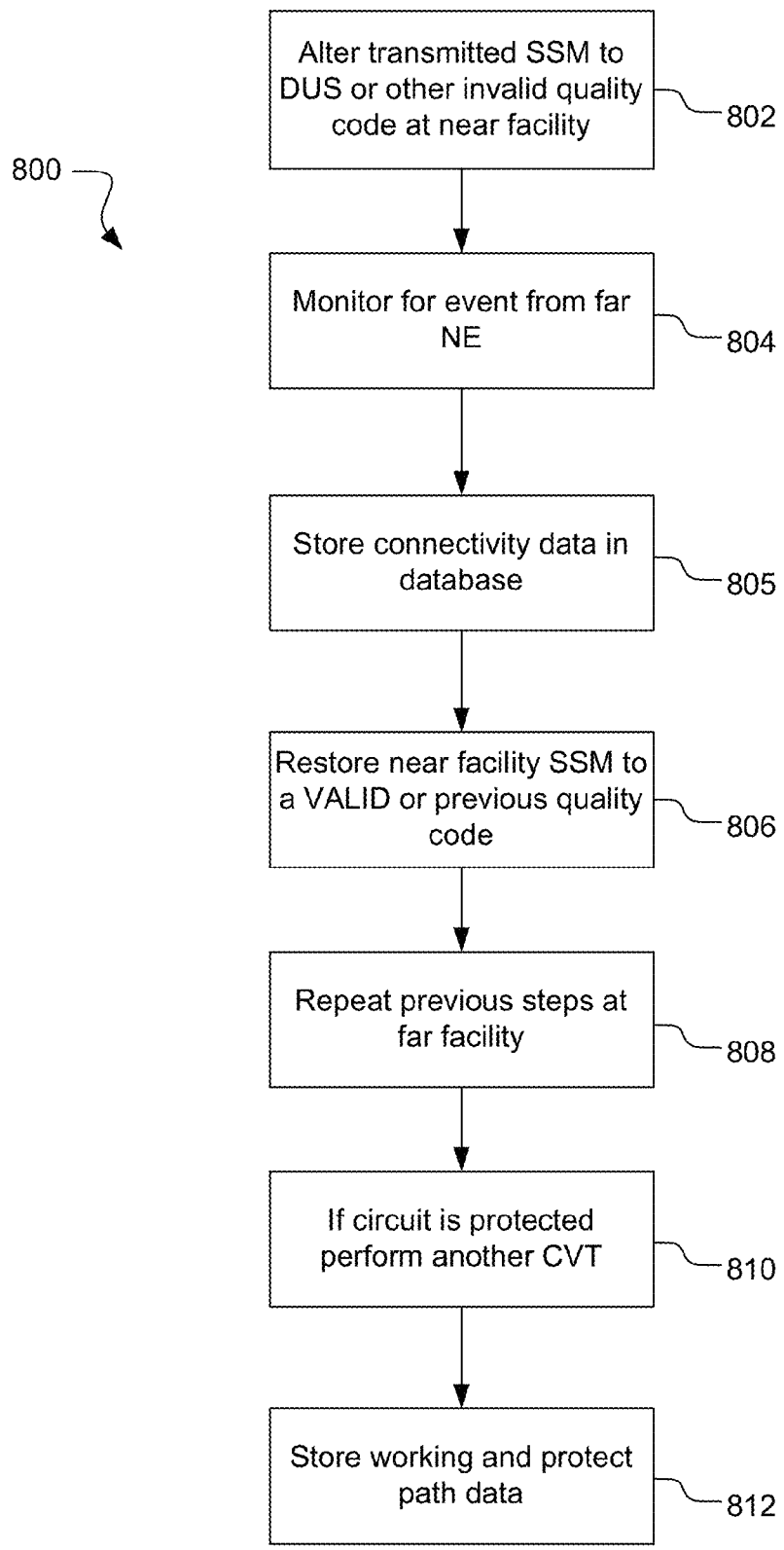

The SSM module 414 generally performs a connectivity validation test using the synchronization status messaging (SSM) byte specified in the SONET standard. The following NEs support SSM: Nortel LH, Nortel DX, FLM150, FLM600, FLM2400, Flash192, and MDK2. The technique allows a non-intrusive method of connectivity verification by utilizing SSM event reporting and alarming when both network elements support SSM. The SSM module 414 can carry out different operations, depending on the type of NE being tested. An illustrative embodiment of SSM algorithm that can be carried out by the SSM module 414 is shown in FIG. 8 and discussed in detail below.

Turning to the connect test signal (CTS) module 418, the CTS module 418 performs a CTS test. Generally, the CTS connectivity test involves simulating an error condition or a degraded signal condition in order to trigger an alarm at a far NE. The CTS test can be performed to verify a protected section between Fujitsu ADMs and other NEs. In one embodiment, the CTS module 418 inverts one or more parity bytes to signal an error or degraded signal when none exists, thereby causing the far NE to generate an alarm that is used to identify the far NE. A particular embodiment of an algorithm that can be carried out by the CTS module 418 is shown in FIG. 8 and discussed in further detail below.

Figure 10:
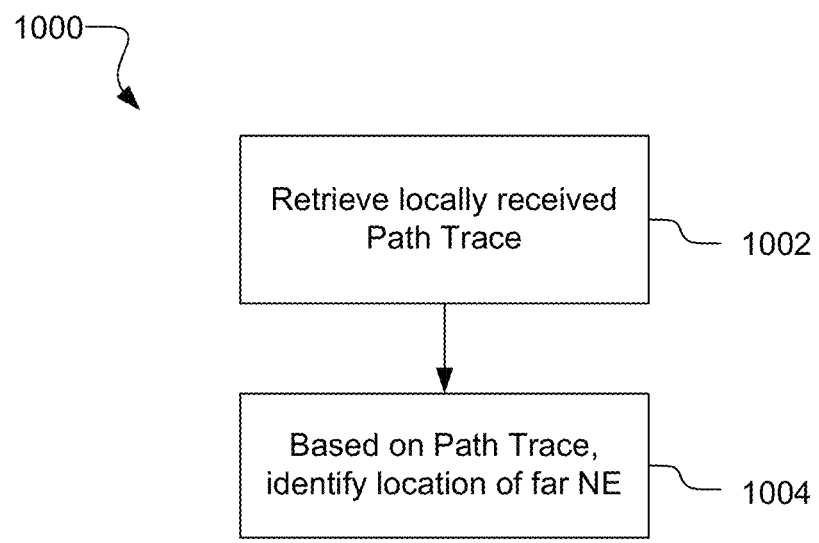

The path trace module 412 uses path trace information to validate section connectivity. In one embodiment, the path trace module 412 retrieves a local path trace and identifies the location of the far NE. An embodiment of a path trace test algorithm is illustrated in FIG. 10 and discussed in detail below.

Figure 11:
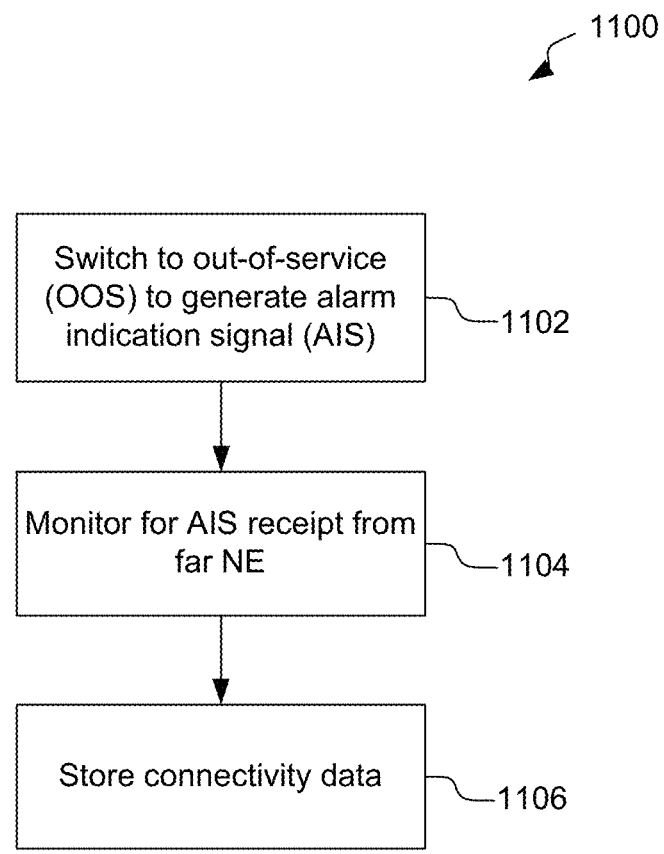

The LOS/AIS module 416 performs loss-of-signal (LOS) tests and alarm indication signal (AIS) tests to validate section connectivity. Generally, the LOS and AIS CVTs cause network service problems from the near NE and monitor for predetermined error signals from the far NE. Particular embodiments of an LOS CVT and an AIS CVT are shown in FIGS. 10-11 and discussed in detail below.

Protection Scheme Validation

Protection scheme validation involves identifying protection schemes used by NEs in the network and determining whether incompatible protection schemes are being employed by connected NEs. Numerous different protection schemes exist. For example, a common protection scheme involves using a protect facility redundantly with a working facility to duplicate the data communicated from an NE. In this example, both the working facility and protect facility communicate the same data, and the receiving NE can choose which data to use, depending on the quality of the data. As discussed above, some NEs are unprotected; i.e., no protection scheme is used. Between complete redundancy and unprotected, there are a number of other protection schemes. An example of incompatible protection schemes are uni-directional and bi-directional.

Protection scheme validation can also facilitate the process of connectivity validation. Specifically, by discovering the protection scheme prior to connectivity validation, the order or manner of conducting connectivity validation tests can be selected to minimize intrusion on traffic being carried in the SONET. For example, in the case of a AIS CVT, which can disrupt traffic, if it is determined that a protected circuit is used, the AIS CVT can be conducted on the protected circuit first, while traffic flows undisrupted on the working circuit. When the AIS CVT is complete on the protected circuit, traffic can be switched to the protected circuit and the AIS CVT can be conducted on the working circuit without disrupting traffic.

In one embodiment, a protection scheme validation module 420 carries out functions related to protection scheme validation. In this embodiment, the connectivity validation tables 406 can include one or more tables that specify protection schemes available for optical carriers of various vendors. The protection scheme validation module 420 can use the protection scheme tables to identify protection schemes being used by NEs. Tables 13 and 14 shown below are illustrative of protection scheme tables that can be included in the CVT tables 406. Commands that can be used to determine the protection schemes are shown below the corresponding table.

TABLE 13

Exemplary Protection Schemes for Nortel 192 DX Optical Carriers

| Protection Scheme | Bandwidth |
| --- | --- |
| 4FBLSR | OC-192 Line |
| 1 + 1 APS | OC-48 Tributary |
|  | OC-12 Tributary |
| Unprotected | OC-48 Tributary |
|  | OC-12 Tributary |

In Table 13, 4FBLSR is an acronym standing for 4 Fiber Bi-directional Line Switched Ring. The acronym 1+1 APS is an acronym standing for "1 plus 1" Automatic Protection Switching. Because OC-48 and OC-12 facilities can have different protection schemes (i.e., 1+1 APS and unprotected), the protection scheme validation module 420 issues commands to the Nortel 192 DX to determine which protection scheme is being used by each facility.

The following command line can be used to determine the protection scheme used for Nortel OC192 ADM tributaries: "mm pr tpt qrpm". The response from the Nortel DX will indicate whether each facility is protected with a status of either "Active" or "Standby". If the facility is listed as Protected (Status="Active" or "Standby"), the command "mm fa ocf qr <facility type> <group number>" can be used to verify whether both members of the protection group are using compatible protection schemes. In response, both groups will provide a primary state and a secondary state. If the primary state is "IS" (in service) and the secondary state is "NIL", then the protection schemes are compatible. However, if either state is "OOS" (out of service) or "FAF" (facility failure) then the protection schemes may be incompatible.

TABLE 14

Exemplary Protection Schemes for Fujitsu FLASH192 ADM Optical Carriers

| Protection Scheme | Bandwidth |
| --- | --- |
| Unprotected | OC-192 Line |
|  | OC-48 Tributary |
|  | OC-12 Tributary |
| 1 + 1 APS | OC-192 Line |
|  | OC-48 Tributary |
|  | OC-12 Tributary |
| UPSR | OC-192 Line |

In Table 14, the acronym UPSR stands for Uni-directional Path Switched Ring. As with the Nortel DX, facilities at the FLASH192 ADM can be configured with more than one protection scheme. To determine which protection scheme is being used by each of the facilities, specified commands can be sent to the FLASH192 ADM. The following TL1 command can be used to retrieve the protection attributes of a FLASH192 ADM facility:

RTRV-FFP-OC192:TID:AIDs:CTAG;

If protection is not provisioned (the circuit is "unprotected"), the following response will be issued:

```
          IP CTAG
          <
          NODE1TERM 02-10-25 15:02:16
          M CTAG COMPLD
          /* No Facility protection group */
```

If protection is provisioned (the circuit is "protected") at a facility, a response similar to the following will be issued:

```
          NODE1TERM 02-09-19 14:11:59
          M 123 COMPLD
          "HS1-1,HS1-2::TYPE=1+1:"
          "HS1-1,HS1-2::WTR=99:"
          "HS1-1,HS1-2::DIRN=UNI:"
          "HS1-1,HS1-2::PTCT=HS1-1:"
          "HS1-1,HS1-2::WCS=Y:"
          "HS1-1,HS1-2::CODEMASK=N:"
          "HS1-1,HS1-2::PRY=LOW:"
```

In the above response, the first AID ("HS1-1") represents the Working group and the second AID ("HS 1-2") represents the Protect group. The parameter "TYPE" identifies the provisioned protection scheme (e.g., 1+1, 1:n). Parameter "DIRN" identifies the provisioned protection path (e.g., UNI or BI)

Continuing with protection scheme verification for the FLASH192 ADM, the protection scheme verification module 420 next verifies that both facilities (the working and protect facilities) are In-Service with the following command:

RTRV-OC192:<TID>:<AID>:CTAG;

For example, the command may be as follows:

RTRV-OC192:NODE1TERM:HS1-1:CTAG;

In response to the foregoing exemplary command, a response such as the following might be received:

```
          NODE1TERM 02-09-19 10:43:50
          M CTAG COMPLD
          "HS1-1::CHIRP=NEG:IS-NR,ACT"
          "HS1-1::OSYNCMSG=Y:IS-NR,ACT"
          "HS1-1::ISYNCMSG=Y:IS-NR,ACT"
          "HS1-1::TRC=141:IS-NR,ACT"
          "HS1-1::EXPTRC=142:IS-NR,ACT"
          "HS1-1::RECTRC=1:IS-NR,ACT"
          "HS1-1::IQL=DUS:IS-NR,ACT"
          "HS1-1::OQL=STU:IS-NR,ACT"
          "HS1-1::BERSDL=-6:IS-NR,ACT"
          "HS1-1::BERSFL=-3:IS-NR,ACT"
          "HS1-1::MODE=SONET:IS-NR,ACT"
          "HS1-1::OWE1=N:IS-NR,ACT"
          "HS1-1::OWE2=N:IS-NR,ACT"
          >
          NODE1TERM 02-09-19 10:43:50
          M CTAG COMPLD
          "HS1-1::FECTRMT=N:IS-NR,ACT"
          "HS1-1::FECRCV=N:IS-NR,ACT"
          "HS1-1::AISPTM=08-00:IS-NR,ACT"
          "HS1-1::AISPCTM=08-00:IS-NR,ACT"
```

-continued

```
          "HS1-1::LAMBDA=NA:IS-NR,ACT"
          "HS1-1::FREQ=NA:IS-NR,ACT"
          "HS1-1::TLDPROV=DIS:IS-NR,ACT"
          ;
```

In the above exemplary response, the final argument ("IS-NR,ACT") of each line indicates the protection state of the indicated facility (it is repeated on each line but should be identical each time it is repeated). The above command should be issued twice for each facility: once for the working facility and once for the protect facility.

As discussed above, the foregoing exemplary tables, commands and responses associated with the Nortel 192 DX and the Fujitsu FLASH192 ADM are merely illustrative of processes that could be implemented for verifying NE protection schemes. Similar protection scheme tables and commands can be developed and employed for other NEs, such as Fujitsu FLM-2400 ADM, Fujitsu FLM-600 ADM, Fujitsu FLM-150 ADM, Alcatel 1631 SX, Alcatel 1633 SX, and Ciena Metro-Director K2. Like the Nortel 192 DX and the Fujitsu FLASH192 ADM, other NEs specify commands for determining the protection scheme being used. As such, those skilled in the art will be able to develop protection scheme verification processes and systems for these and other NEs in accordance with embodiments of the present invention.

Optical Fiber Configuration Validation

Figure 5:
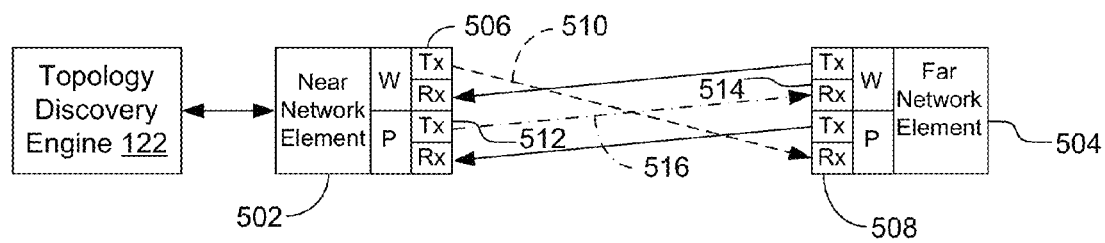
FIG. 5 illustrates an exemplary section in which transposed fibers can be identified by an embodiment of the topology discover engine.

The optical fiber configuration validation module 422 determines whether fibers in a SONET are terminated on the proper work/protect transceivers and receivers. If any fibers are transposed, the optical fiber configuration validation module 422 indicates that the validation failed. To illustrate, FIG. 5 depicts an exemplary configuration in which fibers are transposed between two NEs. As illustrated, a working facility transceiver 506 on near NE 502 is connected to a protect facility receiver 508 on far NE 504 via connection 510 (dotted line). Also illustrated are protect facility transceiver 512 connected to working facility receiver 514 via connection 516 (dashed-dotted line).

Such problems can be identified through optical fiber configuration validation. In one embodiment, the optical fiber configuration validation module 422 performs 16-Byte section traces from the transceiver ports of the near and far NEs, and compares the 16-Byte section traces received at corresponding receiver ports of the near and far NEs. If the 16BST received at a receiver port does not equal the 16BST from the corresponding transceiver, the optical fiber configuration validation fails. Thus, referring to FIG. 5, the 16BST from transceiver 506 will not equal the 16BST received at the receiver 514 of the working facility of far NE 504. Likewise, the 16BST from transceiver 512 will not equal the 16BST received at the receiver 508 of the protect facility.

Loopback Identification

To identify a loopback, embodiments of the TDE 122 includes a loopback validation module 424 that determines whether an optical line facility egresses and ingresses the same NE. Loopbacks generally take on three possible arrangements: the optical line facility is physically looped back onto the same optical port; looped back onto another optical port; or looped back onto multiple optical ports of the same bandwidth on the near NE.

In one embodiment loopbacks are identified by analyzing the data provided by the CVTs. Once a port-port connection is identified, the connection data is checked to identify a corresponding functional pair. If the Tx and the Rx port are part of the same functional pair, then a loopback exists.

STS Mapping Comparison

Turning to the synchronous transport signal (STS) mapping module 426, STS mapping is not a CVT, but is a technique for ordering the CVTs to minimize intrusive tests. Typically STS mapping is performed after the other CVTs have been exhausted because the mapping is not unique. The STS mapping module 326 identifies the mapping of each facility on a near NE and compares the mapping with the facilities of the possible far NEs. The STS mapping module 326 can also compare the possible far NE facility bandwidths and protection schemes. In some embodiments, the STS method is performed after all the non-intrusive CVTs have been completed. After completion of the non-intrusive CVTs, the STS method is then used to search for unique pairs (with a unique fingerprint) and match those, or to form smaller subsets on which the intrusive techniques can be performed.

In one embodiment, the STS mapping module 426 first identifies the active facilities associated with an optical line facility (OLF) on the NE. The STS mapping module 426 does this by analyzing the time slots associated with the OLF. Each lowest order time slot associated with the OLF is encoded to indicate if the time slot is active with a provisioned facility or inactive (Not Provisioned). If the lowest order time slot is inactive, it will be assigned a single bit of value 0. If the lowest order time slot is active it will use two bits, with the first bit assigned a value of 1 and the second bit is assigned a value of 0. The second bit of value 0 indicates the single time slot is used to support a provisioned facility. For active facilities that use multiple lowest order time slots (STS3C, STS12C. etc. . . . ), each time slot is assigned a value of 1. Following the last time slot associated with the active facility requiring multiple time slots, a bit with the value of 0 is added. The final bit of value 0 indicates the previous bits of value 1 are associated with a single active facility that requires multiple time slots.

For example, assuming an OC-12 OLF with the following facilities provisioned:

STS 1 Time Slot 1 Provisioned
STS 1 Time Slot 2 Provisioned
STS 1 Time Slot 3 Provisioned
Time Slot 4 Not Provisioned
Time Slot 5 Not Provisioned
Time Slot 6 Not Provisioned
STS3c Time Slot 7, 8, & 9 Provisioned
STS3c Time Slot 10, 11, & 12 Provisioned Based on the above exemplary data, the STS mapping module 326 generates an encoded mapping of 10101000011101110.

As another example, if the OC-12 OLF has the STS12C Time Slot 1-12 provisioned, the STS mapping module 326 encodes the mapping as 111111111110. Once the mappings are known they can be composed to identify the connectivity if unique.

Note that in this description, for illustrative purposes, the topology discovery engine 122 is generally discussed as if it is a single, independent network device or part of single network device. However, it is contemplated that the topology discovery engine 122 may actually comprise multiple physical and/or logical devices connected in a distributed architecture; and the various functions performed may actually be distributed among multiple of such physical and/or logical devices.

Additionally, in alternative embodiments, the functions performed by the topology discovery engine 122 may be consolidated and/or distributed differently than as described. For example, any function can be implemented on any number of machines or on a single machine. Also, any process may be divided across multiple machines. Specifically, the 16-Byte section trace module 410 and the 1-Byte section trace module 408 may be combined as a single functional unit. Finally, data repository 124 may be a separate data repository in communication with the topology discovery engine 122; the data repository 124 may comprise multiple storage repositories that may be of differing or similar types. For example, data repository 124 may comprise a relational database and/or a repository of flat files.

Exemplary Operations

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Figure 6:
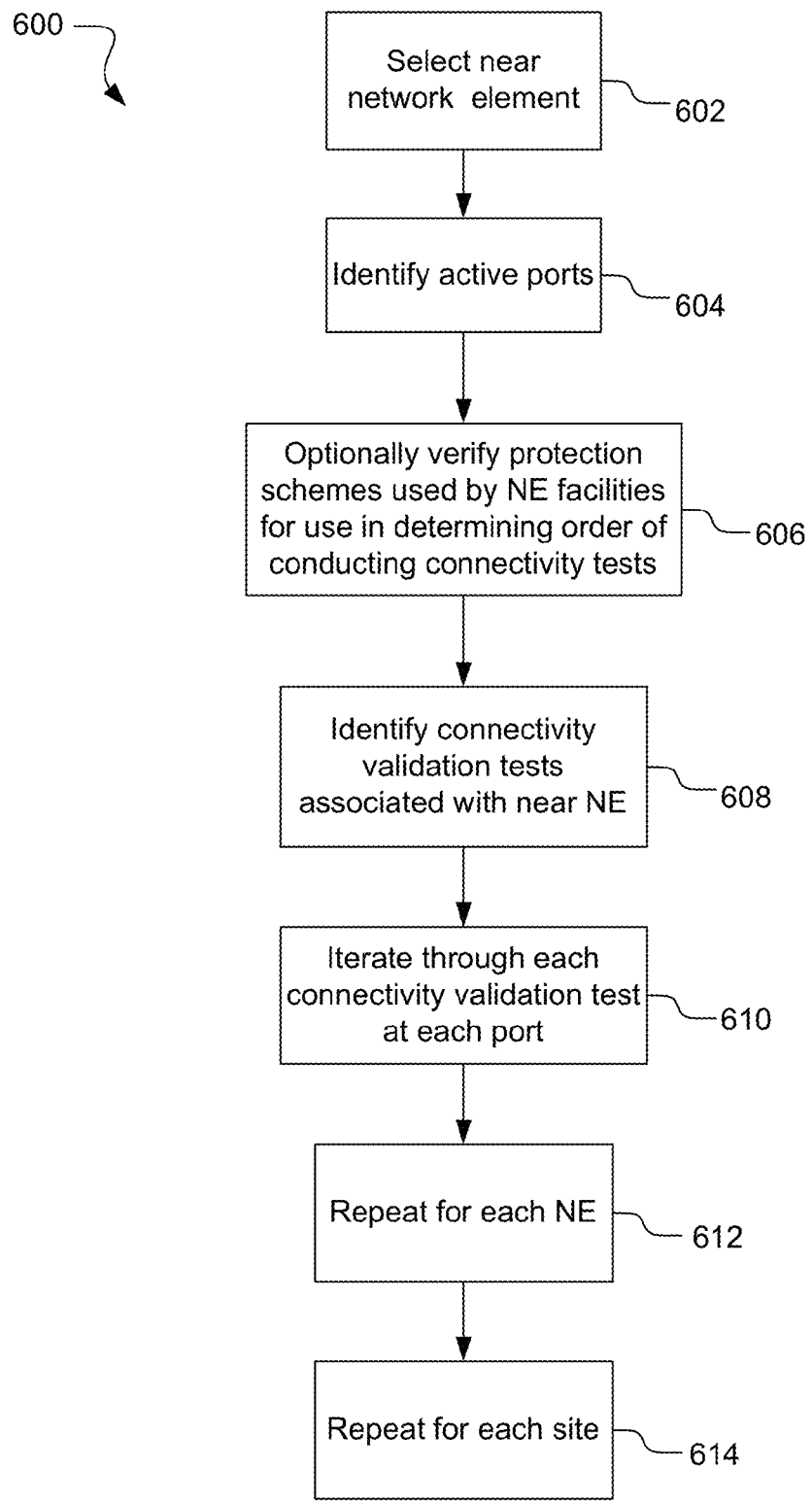
FIGS. 6-13 are flow charts illustrating topology discovery algorithms in accordance with an embodiment of the present invention.

FIG. 6 is a flow chart illustrating an exemplary embodiment of a topology discovery algorithm 600 for discovering network topology on a SONET network. The algorithm 600 can be carried out by the supervisory module 402 of FIG. 4, or another applicable module. The algorithm 600 can be carried out at selected times. For example, the algorithm 600 may be carried out on a periodic basis (e.g., nightly or weekly). According to one embodiment, the algorithm 600 is carried out over a section of a SONET, such as SONET 100 (FIG. 1). According to some embodiments, the algorithm 600 can be carried out over a larger or smaller portion of a network.

A selecting operation 602 selects a near network element (NE), from which to conduct topology discovery. At least some characteristics of the selected NE are known sufficiently to be able to conduct connectivity tests. For example, typically the vendor and model of the selected NE are known. The term 'known' in this context means that the module carrying out the algorithm 600 has or can readily obtain sufficient information about the selected near NE from the NE list 404.

In an identifying operation 604, one or more active ports of the selected NE are identified. In one embodiment, the identifying operation 604 identifies the facilities and/or ports by signaling the selected NE. For example, in the case of NORTEL NTDX and NTLH NEs, the status of each of the facilities can be retrieved using the command, "mm fa ocf list".

An optional verifying operation 606 can be executed to verify the protection schemes, if any, being used by the facilities of the selected NEs. Information about the protection schemes being used by the selected NE can be used to determine the order of carrying out connectivity tests. For NORTEL NTDX and NTLH NEs, the protection status of the tributaries can be verified with the following command line: "mm pr tpt qrpm".

An identifying operation 608 identifies connectivity validation tests associated with the selected near NE. In one embodiment, the identifying operation 608 accesses a list of predetermined connectivity validation tests (CVTs) (e.g., CVT table(s) 406, FIG. 4) in memory. In one embodiment, each CVT is associated with, and can identify, a far NE connected to the near NE.

An iterating operation 610 conducts each identified CVT at each identified active port of the near NE to identify section connectivity between the near NE and a far NE. In one embodiment, the iterating operation 610 calls/executes one or more of the modules shown in FIG. 4 according to the identified CVTs. Exemplary embodiments of CVT algorithms are shown in FIGS. 7-13 and discussed in detail below. Each CVT yields a result(s) indicating whether the far NE is or is not the NE associated with that CVT. If, at a selected port, the result is positive (i.e., the far NE is the type of NE associated with the CVT), the iterating operation 610 stores a section entry in memory, such as discovered topology 419 (FIG. 4). The section entry identifies the near NE, the near port/facility, the far NE, and far port/facility identified in the test. The section entry can include the NE type, the NE location, and other information.

If the result of a CVT is negative (i.e., the far NE is not the type of NE associated with the CVT), the iterating operation 610 selects the next identified CVT and conducts the CVT at the selected port. If all the identified CVTs have been conducted at the selected port, the iterating operation 610 selects the next port. The iterating operation 610 conducts the identified CVTs on the next selected port, and so on.

As discussed above, the order or manner of carrying out the CVTs can be based on any protection schemes that are identified in the verifying operation 506. Thus, one embodiment of the iterating operation 510 conducts the CVTs at each port in an order according to the protection schemes identified for that port. For example, a protected port may be tested first with a potentially intrusive CVT (e.g., AIS or LOS), without interfering with traffic on the working port, and then traffic from the working port can be moved to the protected port while the CVT is conducted on the working port.

After the CVTs are conducted at each port of the selected NE, and the results are gathered, other known NEs can be tested. Typically, but not necessarily, a repeating operation 612 repeats operations 602 through 610 for each known NE in the network. Thus, for example, after a far NE is identified by the algorithm 600, the far NE is known and can be selected by the selecting operation 602 for topology discovery. By repeating the algorithm 600 for all NEs in the network, the resulting discovered topology can reflect the actual topology with a high degree of accuracy and completeness.

Another optional repeating operation 614 can repeat operations 602 through 612 for each network provider site, such as a data center (e.g., data center 108, FIG. 1) or a network operating center (NOC) (e.g., NOC 110, FIG. 1). Thus, for example, if the network provider has a NOC in Dallas, Boston, and San Jose, the algorithm 600 can be repeated at each NOC. The repeating operation 614 can be on a scheduled basis, in which the algorithm 600 is carried out at each site at a predetermined time. In some embodiments, the algorithm 600 is carried out at each site independently from the other sites. The gathered topology data for each site can be stored separately at each site and/or consolidated into one large set of discovered topology data at one site.

In accordance with various embodiments, one or more of the connectivity validation tests (CVTs) shown in the following algorithms are performed iteratively on a port-by-port basis at a selected NE. After the CVTs are performed at one port, another port is selected, and the CVTs performed at that port, and so on.

FIG. 7 is a flowchart illustrating an exemplary algorithm 700 for carrying out a 1-Byte section trace (1BST) test and/or a 16-Byte section trace (16BST) test. The operations in the algorithm 700 can be carried out manually or in an automated fashion, or a combination thereof. In one embodiment, the algorithm 700 receives input including the type of section trace (i.e., either 16BST or 1BST) and identifiers of the near NE from which the test is to be conducted. The inputs to the algorithm 700 may also identify the facility from which a test is to be conducted.

The 1BST test may be used to identify a section within a provider network; however, for large network providers, a 1BST typically does not support enough characters to uniquely identify a particular section within the entire network of the provider. Thus, typically the 1BST test begins with a localizing operation 702 that reduces the scope of the section discovery. In one embodiment, the localizing operation 702 narrows the section test scope within the provider network of North American to market size pieces small enough to enable unique identification of sections using 1BST. The localizing operation 702 is not necessary for the 16BST, because 16 bytes is generally sufficient to uniquely identify all sections in a provider network.

A provisioning operation 704 sets the 1BST or 16BST on the selected NE facility according to network provider section trace standards established for the type of NE. Provisioning typically includes steps of assigning identifiers to be used in the section trace, transmitting the section trace, and setting an expected section trace. In one embodiment, the provisioning operation 704 carries out these steps using different steps based on the type of NE. To illustrate, in one embodiment of the provisioning operation 704, provisioning a 1BST for a NTDX or a NTLH is carried out according to the following criteria:

- 1 Byte Section Trace allows for any number between 0 and 255.
- 0 is not used because it can be confused with a null section trace.
- 255 is reserved as a unique identifier (primarily for isolation of a particular circuit).
- identifiers are assigned on a first-come, first serve basis observing the following rules:
  - The market needs to be isolated (localized) prior to assignments are made
  - A permanent data structure in memory (e.g., table, database) maintains the assignments made All ports are identified prior to assignments being made Assignments will be made based on facility type (e.g., OC3s, OC12s, OC48s, OC192s will each have their own assignment). For example, an OC3 and an OC12 can have a common 1 byte trace Working circuits (and unprotected circuits) are assigned ODD numbers Protect circuits are assigned EVEN numbers Continuing with the provisioning operation 704, after the identifiers are assigned, the section trace is transmitted. In one embodiment involving a NTDX or a NTLH, the 1BST can be entered on a facility using the following commands:

mm fa ocf ed <facility> <group> stm sectiontrace

This command enables sectiontrace [SECTIONTRACE, INTERLEAVE]

mm fa ocf ed <facility> <group> 1byte

This command sets the section trace to a 1 byte trace [16BYTE, 1BYTE]

mm fa ocf ed <facility> <group> btxst 254

This command sets the transmit section trace to 254

<facility> can be "OC192", "OC48" or "OC12"

<group> can be any valid group number for the equipment.
If the facility is an OC12 card, the group will also includes a port number. Ports can be in the range 1-4. For example, <group>=OC12 G5 2.

When provisioning a 16BST for a NTDX or a NTLH, a section trace identifier is assigned and can be a maximum 15 provisionable characters. For Nortel NEs, the standard 16BST format is as follows:

TYPE#xxxxx_Gyy_zz, where

TYPE=Type of Equipment xxxxx=Node ID Number yy=G Card Number zz=Port Number on interface, where Type of Equipment may be:

DX=Interface resides in OPTERA CONNECT DX ADM

CB=4:1 Combiner Interface (TR) residing in an OPTERA LONGHAUL BAY

LH=WT or XR Interface residing in an OPTERA LONGHAUL BAY

LG=Interface resides in a Legacy OC192 ADM (S/DMS TransportNode)

Node ID Number may be a number range from 00001-99999, G Card Number may be a number range from 01-99, and Port Number on interface may be a number range form 01-99 (e.g., DX#00135_G07_01)

In one embodiment of the provisioning operation 704, the 16BST can be entered on a facility of a NTDX or a NTLH using commands such as the following:

mm fa ocf ed <facility> <group> stm sectiontrace

This command enables sectiontrace [SECTIONTRACE, INTERLEAVE]

mm fa ocf ed <facility> <group> 16byte

This command sets the section trace to a 16 byte trace [16BYTE, 1BYTE]

mm fa ocf ed <facility> <group> txst DX#19205_G12_01

This command sets the transmit section trace

The provisioning operation 704 then sets an Expected Section Trace. The expected section trace is used to cause an alarm if the far NE is the NE being tested for. Continuing with Nortel NEs, NTDX, and NTLH as examples, the expected section trace can be entered on a facility using a command set similar to the following:

16 Byte mm fa ocf ed <facility> <group> rxst DX#19205_G12_01

1 Byte mm fa ocf ed <facility> <group> brxst 241

An identifying operation 606 identifies the section trace being received for one or more OC-n facilities. The section trace may be parsed to identify if it is a valid section trace to allow for the identification of the far end network element. In the case of NTDX and NTLH, the identifying operation 706 monitors for an alarm. Active alarms on a Nortel NE can be retrieved with the "al" command. For example, a mismatch between the actual received values and the expected receive values generates an alarm that looks like the following:

| Alm# | Cls | Sh | Type | Unit | Reason | Sev |
|---|---|---|---|---|---|---|
| 4702 | Fac | 2 | OC192 | G11 | 1 Section Trace Mismatch | m,nsa |

If the Nortel network element is provisioned for 16 Byte Section Trace and the far end device is provisioned for 1 Byte Section Trace, the 16 Byte Section Trace "Actual" value will display the message "**PROV.MISMATCH". This mismatch does not generate an alarm.

While embodiments of the provisioning and identifying section trace operations have been illustrated with reference to NTDX and NTLH NEs, those skilled in the art will understand how to provision section traces and identify the section trace for other vendors and types of NEs. The manner of carrying out section traces is typically specified for particular brands, models, and types of NEs.

In a monitoring operation 708, any changes in the section are monitored. In one embodiment, an expected section trace is first set for each optical line facility on both the near and far network elements. Appropriate alarms and/or conditions are then monitored to detect a change in a section.

FIG. 8 illustrates an exemplary synchronization status message (SSM) algorithm 800 for conducting a SSM connectivity validation test. The SSM algorithm 800 can be performed by the SSM module 414 (FIG. 4). In general, section connectivity is validated by altering the Tx SSM Message on one end of the section, and monitoring for an event, alarm or state change. In the illustrated embodiment, it is assumed that the network elements in the section are provisioned properly.

In this regard, for some network providers, Nortel NEs automatically have SSM enabled on all facilities. For some network providers, Nortel facilities are left in an AUTO state signifying that they are transmitting the actual quality code that they are receiving. For other network providers, Nortel elements may have forced values in place (on the line side) so they should always be returned to those values when complete. In some embodiments, Fujitsu NEs are assumed to have SSM turned on and properly alarmed. In some embodiments, it can be assumed that Ciena MDK2 NEs have SSM enabled and have transmitters provisioned to ACTL (ACTuaL).

If it is not known a priori whether SSM is enabled, prior to performing the SSM algorithm 800, SSM capability and whether SSM alarms are enabled can generally be verified for many or all types of NEs. For example, in the case of the Fujitsu FLM2400, the SYS status can be retrieved to determine if SSM capability is enabled. Retrieving SYS status can be done with a command such as the following:

```
;RTRV-SYS:FLM2400LAB3::CTAG;
IP CTAG
<
```

The following data may be received in response to the foregoing command:

```
FLM2400LAB3 02-12-12 14:50:38
M CTAG COMPLD
    "::TYPE=TSA2400TERM1:"
    "::TMG=GP1:,PRI"
    "::TMGOUT=GP1:"
    "::SYNCMSG=Y:"
    "::RVRTV=Y:"
    "::STIMR=Y:"
```

In the foregoing exemplary response data, SYNCMSG=Y indicates that SSM is enabled. The parameter RVRTV=Y indicates that the FLM2400 ADM will automatically revert to a higher priority timing source if its quality code is better than or equal to the existing quality code.

Continuing with the FLM2400 example, it can be verified that SSM alarming is active for each of the facilities using a command such as the following:

```
;RTRV-ATTR-SYNCIN:::CTAG:::;
IP CTAG
<
```

In response to the foregoing command, the following exemplary data may be retrieved:

```
FLM2400LAB3 02-12-12 15:30:56
M CTAG COMPLD
    "EXTCLKINP,SYNCIN:MN,LOM,NEND,NA,,NSA"
    "EXTCLKINP,SYNCIN:MN,SYNCD,NEND,NA,,NSA"
    "EXTCLKINS,SYNCIN:MN,LOM,NEND,NA,,NSA"
    "EXTCLKINS,SYNCIN:MN,SYNCD,NEND,NA,,NSA"
    "1-W,SYNCIN:MN,LOM,NEND,NA,,NSA"
    "1-W,SYNCIN:MN,SYNCD,NEND,NA,,NSA"
    "1-P,SYNCIN:MN,LOM,NEND,NA,,NSA"
    "1-P,SYNCIN:MN,SYNCD,NEND,NA,,NSA"
;
```

In the foregoing exemplary data, the parameters "MN, LOM" and "MN, SYNCD" refer to alarms that are used for alarming in response to SSM messages. Thus, the above data indicates that SSM alarming is active for the FLM2400. SSM capability and alarm activation can also be verified on NORTEL, CIENNA, and other vendor NEs, as will be understood by those skilled in the art, with reference to the specifications of those particular NEs.

After it is determined that SSM capability and alarms are enabled on the near NE, the embodiment of the SSM algorithm 800 performs operations including changing the near NE facility to do-not-use (DUS) or to an invalid quality code, monitoring for a far end alarm or event report, restoring the near facility to VALID or the original quality code, and repeating the foregoing steps from the far NE to validate bidirectional connectivity. If the circuit is protected, another method (e.g., Connect Test Signal) is typically used to isolate the working facility from the protect facility, as is discussed in further detail below.

In an altering operation 802, the SSM transmitted from the near facility is changed to DUS or an equivalent quality code. The altering operation 802 will typically vary depending on the NE being used. For example, because the SSM messaging on working and protect facilities of Fujitsu NEs is not independent when configured in a 1+1 protection configuration, in the case of Fujitsu NEs, changing a Tx SSM to a DUS state on the working facility will change the SSM to a DUS state on the protect facility.

A monitoring operation 804 monitors the circuit for an event from the far NE. In one embodiment, monitoring operation 804 checks for an alarm. In another embodiment, the monitoring operation 804 queries the far NE for a change of state. The monitoring operation 804 may perform different functions, depending on the particular type/vendor of NE. By way of example, but not limitation, the following specifications are relevant to the monitoring operation 804 for NORTEL, FUJITSU, and CIENA NEs, respectively:

Nortel:
  Nortel reports ST1 signal quality as ST1.
  The Tx SSM message may be forced to any SSM code, either SONET or SDH.
  Nortel network elements only alarm a SSM quality change if the incoming message is changed to an invalid quality code. Invalid quality codes include SDH messages if the facility is provisioned as SONET or vice versa.

Fujitsu:
  Fujitsu reports ST1 signal quality as PRS.
  The Tx SSM message can not be forced to any particular quality code, rather, the only options are alternating between a Do not USe (DUS) flag (which will cause the facility to transmit a DUS signal) and a VALID flag (which will cause the facility to transmit the native SSM quality code).
  Fujitsu network elements event report all SSM quality changes.

Ciena MDK2:
  MDK2 reports ST1 signal quality as PRS.
  MDK2 network elements event report all SSM quality changes.

When the monitoring operation 804 detects the alarm, event or state change, it is used to identify the far NE. In one embodiment, the monitoring operation 804 stores the detected alarm, event, or state change. The connectivity is now known. Thus, storing operation 805 stores the connectivity information in the database. Connectivity information may include, but is not limited to, the NE identifiers, rack numbers, port numbers, plug-in numbers, card numbers, shelf numbers, and/or slot numbers associated with connected ports.

A restoring operation 806 then restores the near facility SSM to a VALID or previous quality code. A repeating operation 808 repeat steps 802 through 806 for the far facility to identify a bidirectional connection.

In cases in which the circuit is protected, a performing operation 810 performs a CVT other than the SSM CVT after the far NE is identified. For example, when the working and protect facilities are not independent and changing a Tx SSM to a DUS state on the working facility changes the SSM to a DUS state on the protect facility, another CVT can be used to isolate working facility and the protect facility. In one embodiment, the performing operation 810 performs a Connect Test Signal (CTS) CVT to isolate and verify working and protect paths. A storing operation 812 stores working and protect path information.

Figure 9:
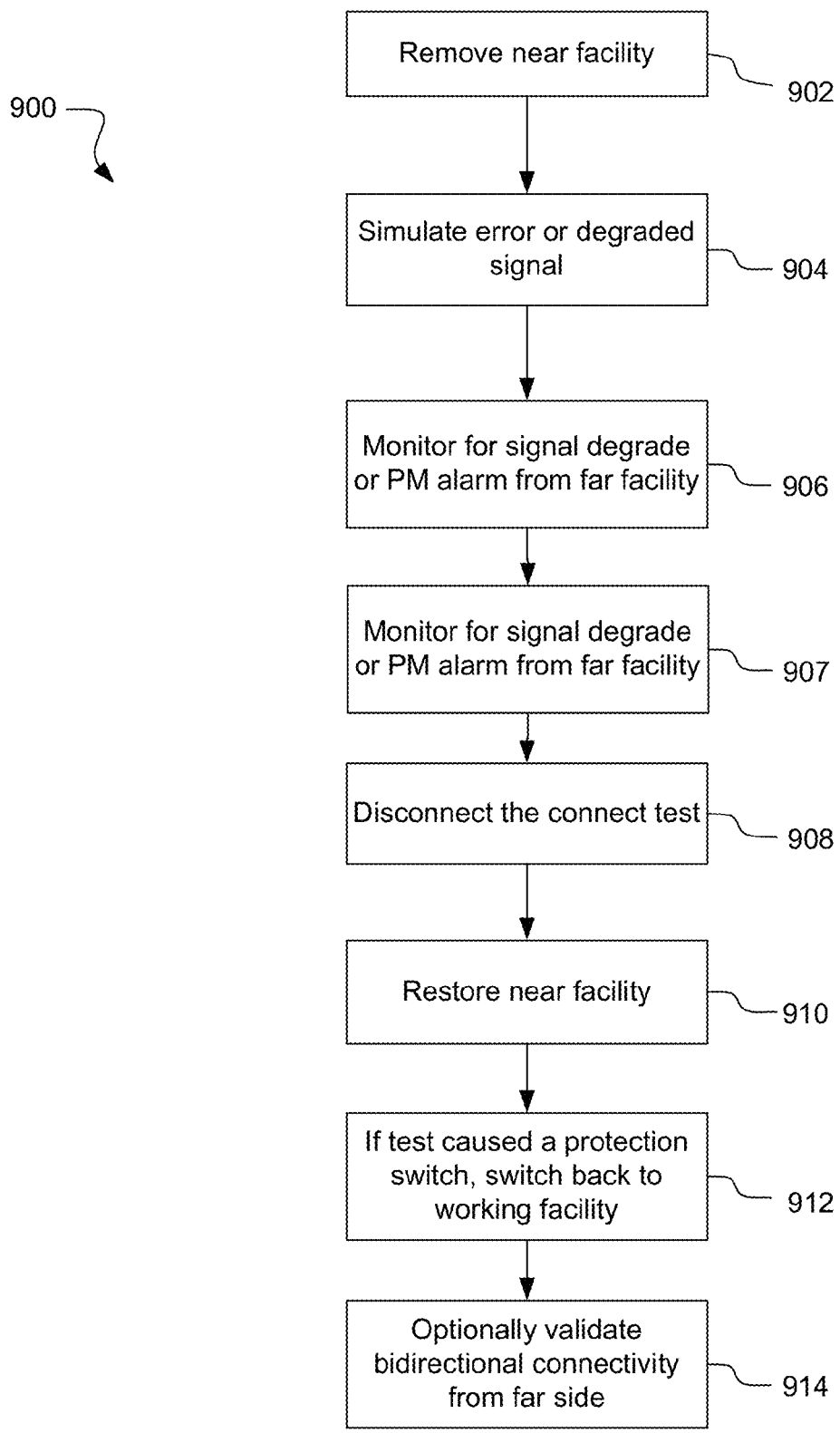

Referring now to FIG. 9, a flowchart depicts one embodiment of a CTS CVT algorithm 900 that can be carried out by the CTS module 418 (FIG. 4). The CTS algorithm 900 generally simulates an error or degraded signal from the near NE in order to cause the far NE to respond in an identifiable manner. In one embodiment, one or more of the B1, B2, or B3 parity bytes of a Fujitsu ADM are inverted in order to simulate the error or degraded signal. To illustrate the CTS algorithm 900, it is described with reference to the FUJITSU FLM2400.

A removing operation 902 removes the near facility by putting the facility into a maintenance state (IS-MT). The maintenance state still passes traffic but allows the facility to be placed into a CTS state. The following command can be issued to the FLM2400 facility to put the facility into a maintenance state:

```
;RMV-OC48:FLM2400LAB3:1-P:CTAG;
IP CTAG
<
   FLM2400LAB3 02-12-18 11:53:40
M CTAG COMPLD
;
```

A simulating operation 904 simulates an error or degraded signal. In embodiments using the FLM2400, the simulating operation 904. In one embodiment, the simulating operation 904 activates the connect test using the following command:

```
;CONN-TSTSIG-OC48:FLM2400LAB3:1-W:CTAG::B1ERR;
IP CTAG
<
   FLM2400LAB3 02-12-18 11:55:04
M CTAG COMPLD
;
   FLM2400LAB3 02-12-18 11:55:04
A 002269 REPT EVT OC48
   "1-W:B1ERR,SC,,,NEND,TRMT,:,,\"B1 error data generated\""
;
   FLM2400LAB3 02-12-18 11:55:05
* 002270 REPT ALM COM
   ":MN,MAN,NSA,,,NEND,NA:\"Manually caused abnormal condition\""
;
```

The foregoing command causes the FLM2400 facility to generate errors in the B1 parity byte, as indicated by the parameter "1-W: B1ERR". As indicated by the exemplary facility data, the designated facility is generating B1 errors in this example to simulate an error. The command can be changed to cause the facility to generate errors in the B2 and/or B3 parity bytes. This would be done by replacing "B1ERR" with "B2ERR" or "B3ERR" in the command line.

A monitoring operation 906 monitors data from the far NE responsive to the simulated error or degraded signal. In one embodiment, the monitoring operation 906 checks for an alarm that is indicative of the far NE. The monitoring operation 906 can store any detected data from the far NE. A storing operation 907 stores connectivity information obtained in the monitoring operation 906.

A disconnecting operation 908 disconnects the test and restores the FLM2400 facility to normal working condition. In one embodiment, the disconnecting operation 908 issues the following command:

```
;DISC-TSTSIG-OC48:FLM2400LAB3:1-P:CTAG;
IP CTAG
<
   FLM2400LAB3 02-12-18 11:58:37
M CTAG COMPLD
;
   FLM2400LAB3 02-12-18 11:58:37
A 002276 REPT EVT OC48
   "1-P:B1ERR,CL,,,NEND,TRMT,: ,,\"B1 error data generated\""
;
   FLM2400LAB3 02-12-18 11:58:39
A 002277 REPT ALM COM
   ":CL,MAN,NSA,,,NEND,NA:\"Manually caused abnormal condition\""
;
```

After the connect test signal is disconnected, a restoring operation 910 restores the facility from the maintenance state. In one embodiment, the restoring operation 910 issues the following command:

```
;RST-OC48:FLM2400LAB3:1-P:c;
IP c
<
   FLM2400LAB3 02-12-18 12:05:29
M C COMPLD
;
```

The restoring operation 910 can also verify that all of the facilities have been restored from a maintenance state, using the following command:

```
;RTRV-OC48:FLM2400LAB3:ALL:CTAG;
IP CTAG
<
   FLM2400LAB3 02-12-18 12:06:21
M CTAG COMPLD
   "1-W:RCV::IS,ACT"
   "1-P:RCV::IS,STBY"
;
```

According to one embodiment, if the CTS test caused a protection switch, a switching operation 912 switches back to the working facility. The switching operation 912 can be performed manually or automatically. For example, the NE can be queried for circuit states before and after the protection switch, and then can be automatically switched back to the original state by the switching operation 912. An optional validating operation 914 validates bidirectional connectivity between the near and far NEs by applying operations 902 through 912 starting from the far NE.

The CTS algorithm 900 can be used on working, protect or unprotected facilities. However, the use of CTS on a working facility could cause a protection switch. Because the CTS CVT can cause performance monitoring (PM) alarms, can cause a protection switch if used on the working facility, and the PM alarms may be difficult to isolate on the network, the CTS CVT is typically not a primary CVT. As indicated above, the CTS CVT can be used as secondary test along with the SSM CVT.

FIG. 10 illustrates an exemplary path trace algorithm 1000 that can be carried out by the path trace module 412 (FIG. 4). The PT algorithm 1000 is typically employed when DCS to DCS intermachine trunks (IMTs) are found on the network. A retrieving operation 1002 retrieves local path trace data, and an identifying operation 1004 identifies the location of a far NE based on the path trace. The identifying operation 1004 is typically carried out according to a network provider standard.

Figure 12:
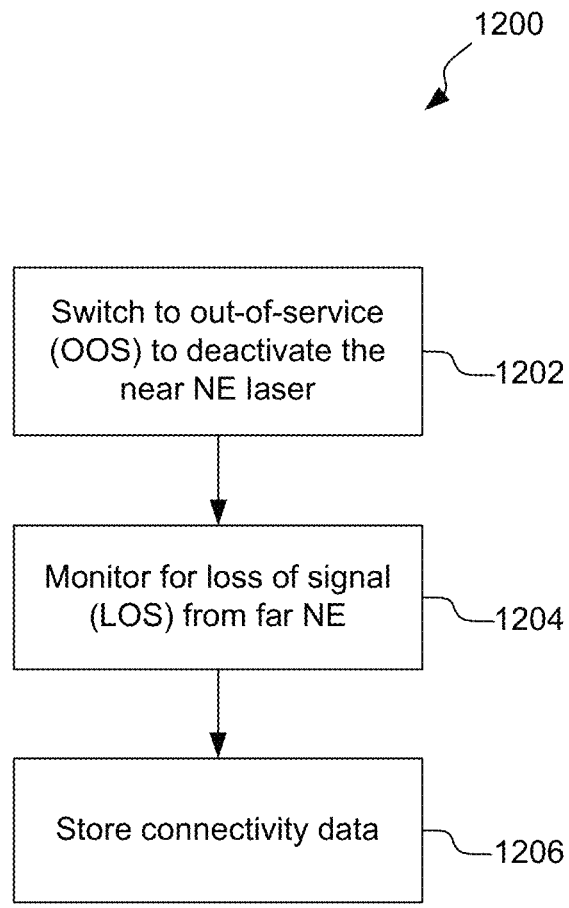

FIG. 11 illustrates an exemplary alarm indication signal (AIS) test algorithm 1100 that can be carried out by the LOS/AIS module 416 (FIG. 4). FIG. 12 illustrates an exemplary loss-of-signal (LOS) test algorithm 1200 that can be carried out by the LOS/AIS module 316 (FIG. 3). Whether the AIS test is performed or the LOS test is performed depends upon the type of near NE. Some NEs generate AIS when turned OOS, and some NEs turn off the laser. Both the AIS test and the LOS test are potentially intrusive.

Referring to the AIS algorithm 1100, initially, a switching operation 1102 switches a selected port of the near NE to out-of-service (OOS), thereby causing the near NE to generate an AIS. A monitoring operation 1004 then monitors the circuit for data indicating receipt of the AIS at the far NE. AIS receipt data is stored and used to identify the port on the far NE that is connected to the selected port on the near NE. A storing operation 1106 stores connectivity data that identifies the selected port on the near NE and the connected port on the far NE. The connectivity data can include the associated NE, rack number, port number, slot number, shelf number, card number, etc.

Referring to FIG. 12, the LOS algorithm 1200 is illustrated. A switching operation 1202 switches a selected port of the near NE to out-of-service (OOS), thereby causing the near NE to turn off the laser. A monitoring operation 1204 then monitors the circuit for an LOS from the far NE. The LOS is stored and used to identify the port on the far NE that is connected to the selected port on the near NE. A storing operation 1206 stores connectivity data that identifies the selected port on the near NE and the connected port on the far NE. As discussed above, the connectivity data can include the NE, rack number, port number, slot number, shelf number, card number, etc.

Figure 13:
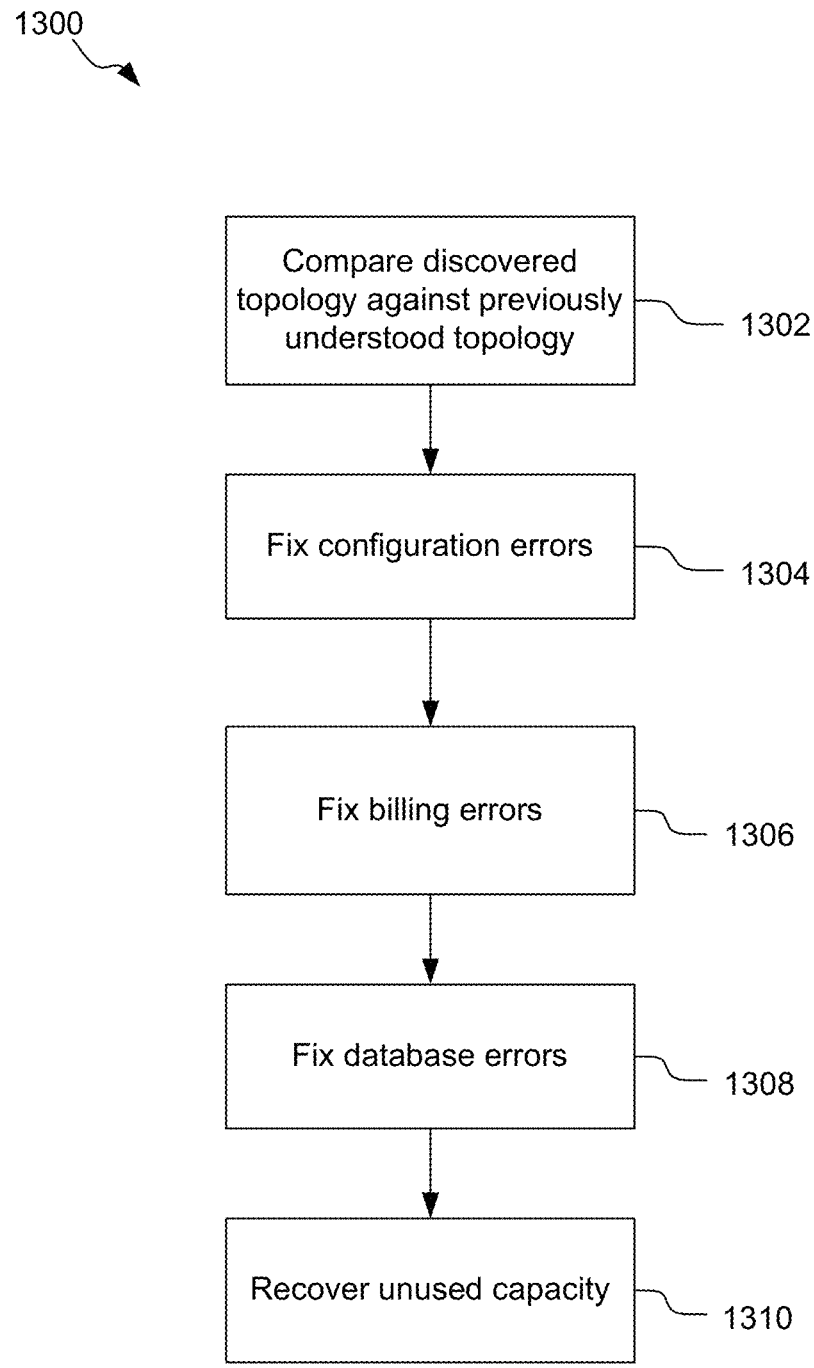

After the connectivity validation tests are completed and the port connections are compiled, the data can be used beneficially. FIG. 13 illustrates an exemplary process 1300 showing beneficial ways of using the discovered topology data. Generally, the process 1300 analyzes the newly discovered topology to determine what changes can be made to improve network operations.

A comparing operation 1302 compares the newly discovered topology to the originally understood topology (e.g., provisioning database). Comparing can be performed by a simple ASCII comparison, or other method. Any difference can be stored in a file and/or marked. Based on the differences, beneficial network changes can be made.

In a fixing operation 1304 any identified configuration errors are fixed in the network database. Here, configuration errors refer to erroneous physical connections, such as, but not limited to, transposed optical fibers between NEs, and unnecessary loopbacks. In another fixing operation 1306, if newly discovered topology impacts billing in any way, any identified billing errors are fixed. In another fixing operation 1308, any errors in a provisioned topology database are updated with the correct topology data. In a recovering operation 1310, any capacity that is unused due to an erroneous indication in the database that the capacity was in use, is marked as being available for use.

Exemplary Computing Device

Figure 14:
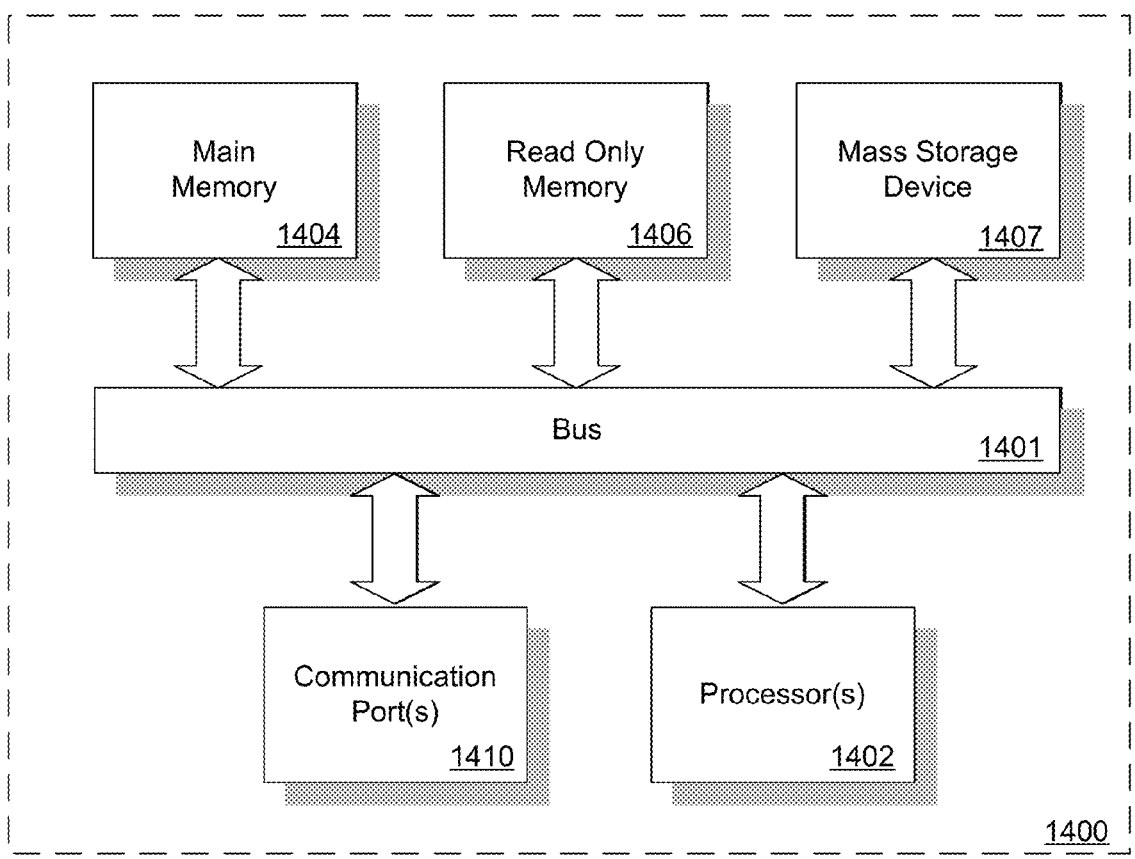
FIG. 14 is a block diagram illustrating a general-purpose computer that can be used to implement topology discovery in accordance with embodiments of the present invention.

FIG. 14 illustrates an exemplary machine in the form of a computer system 1400, which can be used to perform the topology discovery methods and systems described herein. The computer system 1400 is representative of many types of computing devices and systems, such as an exemplary database server, application server, or policy based storage management (PBSM) server, or web server, in which features of the present invention may be implemented will now be described with reference to FIG. 14. In this simplified example, the computer system 1400 comprises a bus or other communication means 1401 for communicating information, and a processing means such as one or more processors 1402 coupled with bus 1401 for processing information.

Computer system 1400 further comprises a random access memory (RAM) or other dynamic storage device 1404 (referred to as main memory), coupled to bus 1401 for storing information and instructions to be executed by processor(s) 1402. Main memory 1404 also may be used for storing temporary variables or other intermediate information during execution of instructions by processor(s) 1402. Computer system 1400 also comprises a read only memory (ROM) and/or other static storage device 1406 coupled to bus 1401 for storing static information and instructions for processor 1402. A data storage device 1407 such as a magnetic disk or optical disc and its corresponding drive may also be coupled to bus 1401 for storing information and instructions.

One or more communication ports 1410 may also be coupled to bus 1401 for allowing communication and exchange of information to/from with the computer system 1400 by way of a Local Area Network (LAN), Wide Area Network (WAN), Metropolitan Area Network (MAN), the Internet, or the public switched telephone network (PSTN), for example. The communication ports 1410 may include various combinations of well-known interfaces, such as one or more modems to provide dial up capability, one or more 10/100 Ethernet ports, one or more Gigabit Ethernet ports (fiber and/or copper), or other well-known interfaces, such as Asynchronous Transfer Mode (ATM) ports and other interfaces commonly used in existing LAN, WAN, MAN network environments. In any event, in this manner, the computer system 1400 may be coupled to a number of other network devices, clients and/or servers via a conventional network infrastructure, such as a company's Intranet and/or the Internet, for example.

Embodiments of the present invention may be provided as a computer program product which may include a machine-readable medium having stored thereon instructions which may be used to program a computer (or other electronic devices) to perform a process according to the methodologies described herein. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

CONCLUSION

In conclusion, embodiments of the present invention provide novel systems and methods for remotely discovering network topology. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for determining network topology of a provider network, the network including a plurality of network elements, the method comprising:
selecting a first network element;
selecting a first port on the first network element; and
iteratively performing connectivity validation tests using the first port, wherein each connectivity validation test is associated with a type of network element and yields a result that indicates whether a second port on a second network element of the associated type is connected to the first port, wherein at least one of the connectivity validation tests performs operations comprising:
deactivating a laser on the first port; and
detecting a loss of signal (LOS) message from the second port.

2. A method as recited in claim 1 wherein one of the connectivity validation tests comprises performing a section trace using the first port.

3. A method as recited in claim 1 further comprising:
storing connectivity data in memory, the connectivity data identifying at least the first port and the second port.

4. A method as recited in claim 3 wherein storing connectivity data comprises storing one or more of a network element identifier, a rack identifier, a shelf identifier, a slot identifier, a plug-in identifier, a card identifier, and a port number associated with each of the first port and the second port.

5. A method as recited in claim 1 wherein at least one of the connectivity validation tests performs operations comprising:
generating an alarm indication signal (AIS) at the first port; and
detecting an AIS receipt from the second port.

6. A method as recited in claim 1 wherein at least one of the connectivity validation tests performs a path trace from the first port to identify a location of the second network element.

7. A method as recited in claim 1 wherein the provider network comprises a synchronous optical network (SONET).

8. A method as recited in claim 1 wherein each of the first network element and the second network element is selected from a group consisting of:
a router,
a switch,
an optical circuit switch (OCS),
an add-drop multiplexer (ADM), and
a wavelength division multiplexer (WDM).

9. A method as recited in claim 7 further comprising performing an optical fiber configuration validation test operable to determine whether one or more fibers between the first and second network elements are transposed.

10. A method as recited in claim 1 further comprising identifying a protection scheme used at a facility of the first network element and a protection scheme used at a facility of the second network element in communication with the facility of the first network element.

11. A method as recited in claim 10 wherein the connectivity validation tests are performed in an order based on the identified protection schemes.

12. A method as recited in claim 4 further comprising:
determining one or more ports on the first network element are available, wherein the one or more ports are identified in the memory as being unavailable;
marking the one or more port identifiers in the memory as available.

13. A system for discovering topology of a network, the system comprising:
at least one processor; and
a topology discovery engine operable to use the at least one processor to identify a first port of a far network element that is connected to a second port of a near network element by remotely altering operation of the near network element to cause the far network element to respond in a manner that identifies the first port, wherein the topology discovery engine comprises a loss-of-signal (LOS) module operable to cause the near network element to deactivate a laser on the second port, the LOS module further operable to detect a LOS message from the first port on the far network element.

14. A system as recited in claim 13, wherein the topology discovery engine performs one or more connectivity validation tests, wherein each connectivity validation test corresponds to at least one type of network element, and wherein the manner of response to each connectivity validation test is indicative of the type of far network element.

15. A system as recited in claim 13 wherein the topology discovery engine comprises an alarm indication signal (AIS) module operable to cause the near network element to generate an AIS from the second port, the AIS module further operable to detect an AIS receipt message from the first port on the far network element.

16. A system as recited in claim 13 wherein the topology discovery engine comprises a connect test signal (CTS) module operable to cause the near network element to generate a parity byte error from the second port and to monitor for a performance management (PM) alarm from the first port of the far network element.

17. A system as recited in claim 13 wherein the topology discovery engine further comprises a loopback validation module operable to identify a loopback connection associated with the near network element.

18. A system as recited in claim 13 wherein the topology discovery engine further comprises an optical fiber configuration validation module operable to identify transposed fibers between the near and far network elements.

19. A system as recited in claim 13 wherein the topology discovery engine further comprises a protection scheme validation module operable to identify a protection scheme implemented at the near network element.

20. A system as recited in claim 14 wherein the topology discovery engine further comprises a synchronous transport signal (STS) mapping module operable to identify mapping of facilities on the near network element and compare the mapping with mapping of facilities on the far network element.

21. A system as recited in claim 20 wherein the topology discovery engine further performs the one or more connectivity validation tests in an order based on the mapping of facilities identified by the STS mapping module.

22. A method for determining network topology of a provider network, the network including a plurality of network elements, the method comprising:
selecting a first network element;
selecting a first port on the first network element; and
iteratively performing connectivity validation tests using the first port, wherein each connectivity validation test is associated with a type of network element and yields a result that indicates whether a second port on a second network element of the associated type is connected to the first port, wherein the connectivity validation tests are performed at least by deactivating a laser on the first port and detecting a loss-of-signal message from the second port, and wherein the connectivity validation tests are performed in an order based on a protection scheme identified for the first network element and a protection scheme identified for the second network element.

* * * * *